US012718608B2

(12) United States Patent
Watson et al.

(10) Patent No.: US 12,718,608 B2
(45) Date of Patent: Aug. 25, 2026

(54) SYSTEM AND METHOD FOR VISION-ASSISTED APPROACH FOR GRAPH STRUCTURE EXTRACTION IN VARIOUS TYPES OF DOCUMENTS

(71) Applicant: JPMorgan Chase Bank, N.A., New York, NY (US)

(72) Inventors: William Watson, Long Beach, NY (US); Naan Cho, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 271 days.

(21) Appl. No.: 18/666,318

(22) Filed: May 16, 2024

(65) Prior Publication Data

US 2025/0356676 A1 Nov. 20, 2025

(51) Int. Cl.

| | |
|---|---|
| ***G06V 30/00*** | (2022.01) |
| ***G06T 5/30*** | (2006.01) |
| ***G06T 5/70*** | (2024.01) |
| ***G06V 10/46*** | (2022.01) |
| ***G06V 20/70*** | (2022.01) |
| ***G06V 30/18*** | (2022.01) |

(52) U.S. Cl.
CPC .......... *G06V 30/18181* (2022.01); *G06T 5/30* (2013.01); *G06T 5/70* (2024.01); *G06V 10/46* (2022.01); *G06V 20/70* (2022.01); *G06T 2207/20036* (2013.01)

(58) Field of Classification Search
CPC .. G06V 30/18181; G06V 10/46; G06V 20/70; G06V 30/422; G06T 5/30; G06T 5/70; G06T 2207/20036
See application file for complete search history.

(56) References Cited

FOREIGN PATENT DOCUMENTS

| | | | | |
|---|---|---|---|---|
| CN | 116152841 A * | 5/2023 | ........... | G06V 30/413 |
| WO | WO-2025073354 A1 * | 4/2025 | ............... | G06N 3/08 |

OTHER PUBLICATIONS

Garz et al, A User-Centered Segmentation Method for Complex Historical Manuscripts Based on Document Graphs, IEEE Transactions on Human-Machine Systems, vol. 47, Issue 2, Apr. 2017.*

(Continued)

*Primary Examiner* — Xiao Liu
(74) *Attorney, Agent, or Firm* — GREENBLUM & BERNSTEIN, P.L.C.

(57) ABSTRACT

Various methods and processes, apparatuses or systems, and media for deterministically deriving underlying graph structure and associated text information in a document are disclosed. A processor implements a vision-based algorithm and a network-based algorithm that may extract and structure a diagram from an image obtained from the document. The processor deterministically derives underlying graph structure and associated text information in the document by applying the vision-based algorithm and the network-based algorithm, thereby allowing encoding of graph content and reasoning into downstream applications including LLM inputs, graphical question-answering, and information extraction tasks. The processor also implements OCR algorithm for text fields, and then isolates which piece of text belongs to which node by examining the spatial coordinates of the text against bounding box of the node and executes cross-page resolution.

20 Claims, 16 Drawing Sheets

(56) References Cited

OTHER PUBLICATIONS

Couprie et al, Power Watershed: a Unifying Graph-Based Optimization Framework, IEEE Transactions on Pattern Analysis and Machine Intelligence, vol. 33, Issue 7, Jul. 2011.*

* cited by examiner

200

700

600

900

800

1100

1000

1300

1200

1500

1400

1700

1600

2100

2000

2200

SYSTEM AND METHOD FOR VISION-ASSISTED APPROACH FOR GRAPH STRUCTURE EXTRACTION IN VARIOUS TYPES OF DOCUMENTS

TECHNICAL FIELD

This disclosure generally relates to data processing, and, more particularly, to methods and apparatuses for implementing a platform, language, cloud, and database agnostic vision-assisted network discovery module configured to implement a vision-assisted network discovery algorithm to discover, extract, and organize graph structured diagrams in visual mediums into a structured representation.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Visual content and diagrams may be imbued with a mix of language, spatial, and visual features that each may provide valuable signals. In a diagram, content may not be aligned in neat rows or sequences, yet dispersed and organized in some direction of information flow. For example, a tree diagram may be an organizational hierarchy with managers above direct reports. Other types may include ownership charts, flowcharts, supply chain graphs, investor relationships, etc.

Conventional approach/tool in extracting graph structure from documents, however, are very slow in which one is simply looking at just a pixel color. Moreover, conventional approach/tool fails to implement a vision-based approach thereby lacking the configuration in understanding space (i.e., empty space or blank space or negative space) in documents, and therefore, fails to understand structure of flow charts, organizational charts, tables, or of the document itself.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic vision-assisted network discovery module configured to implement a vision-assisted network discovery algorithm to discover, extract, and organize graph structured diagrams in visual mediums into a structured representation, but the disclosure is not limited thereto. For example, the graph structure extraction module, according to an embodiment, may be configured to implement a vision-assisted network discovery algorithm in a manner such that one may understand space (i.e., empty space or blank space or negative space) in documents (i.e., Portable Document Formats (PDFs), images, Hyper Text Markup Language (HTML), etc.) which then may help to understand structure of flow charts, organizational charts, tables, or of the document itself, but the disclosure is not limited thereto.

For example, diagrams encode hierarchal relationships and ordering through spatial features that may not be explicitly captured through standard optical character recognition programs and natural language algorithms. According to an embodiment, by taking a multimodal approach, as implemented by the vision-assisted network discovery module as disclosed herein, may be configured to implement a vision-assisted network discovery algorithm that may be able to deterministically derive the underlying graph structure and associated text information per vertex node through a combination of vision and network algorithms, thereby allowing encoding of graph content and reasoning into downstream applications such as Large Language Model (LLM) inputs, graphical question-answering, and information extraction tasks, but the disclosure is not limited thereto. For example, the vision-assisted network discovery module may implement an Optical Character Recognition (OCR) algorithm for text fields, and then may isolate which piece of text belongs to which node by examining the spatial coordinates of the text against bounding box of the node and may execute cross-page resolution.

According to exemplary embodiments, a method for deterministically deriving underlying graph structure and associated text information in a document by utilizing one or more processors along with allocated memory is disclosed. The method may include: implementing a vision-based algorithm that may include the following, but the disclosure is not limited thereto: converting a diagram identified from the document into a first image; converting the first image into a grayscale image; applying an adaptive threshold algorithm to the grayscale image and removing noise and smoothing the grayscale image and generating a smoothed image; identifying contours from the smoothed image; implementing a first algorithm onto the smoothed image to determine a bounded area connected to a given node among a plurality of node pixels within the identified contours; implementing a second algorithm to expand the node pixels to be thicker thereby expanding out node boundaries of objects themselves; utilizing connected components to individually label regions of nodes as a single entity; implementing a watershed algorithm to apply the labels onto the grayscale image; determining contour of each node; implementing a network-based algorithm that may include the following, but the disclosure is not limited thereto: selecting, for each node, a middle pixel that is still a valid marker; aggregating all node pixels with same value as one object; combining, given the nodes, every pair; launching a graph search between two adjacent nodes; recording a path and intermediate nodes traversed; condensing, given the path, consecutive pixel values into a single item providing unique nodes per step; creating a smaller graph including only marker identifiers as a network; transposing the network on the first image; and deterministically deriving underlying graph structure and associated text information in the document by applying the vision-based algorithm and the network-based algorithm.

According to exemplary embodiments, the document may be one or more of the following documents: a PDF document, an image, and a HTML document, etc., but the disclosure is not limited thereto.

According to exemplary embodiments, in implementing the first algorithm, the method may further include: applying a flood fill algorithm onto the smoothed image, wherein continuous blocks of pixels form the nodes, and wherein the nodes represent thicker objects.

According to exemplary embodiments, in implementing the second algorithm, the method may further include: applying morphological operations with 1×1 kernel.

According to exemplary embodiments, the method may further include: applying a dilation algorithm that adds pixels to the boundaries of objects in the smoothed image and creating a new image by overlapping a kernel at each pixel, wherein when any pixel in an N×N kernel is 1, that new pixel is 1, thereby expanding white regions when any white pixel falls in a kernel space.

According to exemplary embodiments, the method may further include: applying an erosion algorithm in which a new image is created by overlapping an N×N kernel over each pixel, wherein when all pixels under the kernel are 1, it places a 1, and when any pixel is 0, the whole value is 0, thereby eroding away the node boundaries of objects and leaves only solid regions of white pixels.

According to exemplary embodiments, in applying an adaptive threshold algorithm, the method may further include: implementing an adaptive mean threshold algorithm; and implementing Otsu thresholding algorithm to return a single intensity threshold that separate pixels into two partitions which minimizes variance between the two partitions.

According to exemplary embodiments, a system for deterministically deriving underlying graph structure and associated text information in a document is disclosed. The system may include: a processor; and a memory operatively connected to the processor via a communication interface, the memory storing computer readable instructions, when executed, may cause the processor to: implement a vision-based algorithm that may include the following, but the disclosure is not limited thereto: converting a diagram identified from the document into a first image; converting the first image into a grayscale image; applying an adaptive threshold algorithm to the grayscale image and removing noise and smoothing the grayscale image and generating a smoothed image; identifying contours from the smoothed image; implementing a first algorithm onto the smoothed image to determine a bounded area connected to a given node among a plurality of node pixels within the identified contours; implementing a second algorithm to expand the node pixels to be thicker thereby expanding out node boundaries of objects themselves; utilizing connected components to individually label regions of nodes as a single entity; implementing a watershed algorithm to apply the labels onto the grayscale image; determining contour of each node; implement a network-based algorithm that may include that may include the following, but the disclosure is not limited thereto: selecting, for each node, a middle pixel that is still a valid marker; aggregating all node pixels with same value as one object; combining, given the nodes, every pair; launching a graph search between two adjacent nodes; recording a path and intermediate nodes traversed; condensing, given the path, consecutive pixel values into a single item providing unique nodes per step; creating a smaller graph including only marker identifiers as a network; transposing the network on the first image; and deterministically derive underlying graph structure and associated text information in the document by applying the vision-based algorithm and the network-based algorithm.

According to exemplary embodiments, in implementing the first algorithm, the processor may be further configured to: apply a flood fill algorithm onto the smoothed image, wherein continuous blocks of pixels form the nodes, and wherein the nodes represent thicker objects.

According to exemplary embodiments, in implementing the second algorithm, the processor may be further configured to: apply morphological operations with 1×1 kernel.

According to exemplary embodiments, the processor may be further configured to: apply a dilation algorithm that adds pixels to the boundaries of objects in the smoothed image and create a new image by overlapping a kernel at each pixel, wherein when any pixel in an N×N kernel is 1, that new pixel is 1, thereby expanding white regions when any white pixel falls in a kernel space.

According to exemplary embodiments, the processor may be further configured to: apply an erosion algorithm in which a new image is created by overlapping an N×N kernel over each pixel, wherein when all pixels under the kernel are 1, it places a 1, and when any pixel is 0, the whole value is 0, thereby eroding away the node boundaries of objects and leaves only solid regions of white pixels.

According to exemplary embodiments, in applying an adaptive threshold algorithm, the processor may be further configured to: implement an adaptive mean threshold algorithm; and implement Otsu thresholding algorithm to return a single intensity threshold that separate pixels into two partitions which minimizes variance between the two partitions.

According to exemplary embodiments, a non-transitory computer readable medium configured to store instructions for deterministically deriving underlying graph structure and associated text information in a document is disclosed. The instructions, when executed, may cause a processor to perform the following: implementing a vision-based algorithm that may include the following, but the disclosure is not limited thereto: converting a diagram identified from the document into a first image; converting the first image into a grayscale image; applying an adaptive threshold algorithm to the grayscale image and removing noise and smoothing the grayscale image and generating a smoothed image; identifying contours from the smoothed image; implementing a first algorithm onto the smoothed image to determine a bounded area connected to a given node among a plurality of node pixels within the identified contours; implementing a second algorithm to expand the node pixels to be thicker thereby expanding out node boundaries of objects themselves; utilizing connected components to individually label regions of nodes as a single entity; implementing a watershed algorithm to apply the labels onto the grayscale image; determining contour of each node; implementing a network-based algorithm that may include the following, but the disclosure is not limited thereto: selecting, for each node, a middle pixel that is still a valid marker; aggregating all node pixels with same value as one object; combining, given the nodes, every pair; launching a graph search between two adjacent nodes; recording a path and intermediate nodes traversed; condensing, given the path, consecutive pixel values into a single item providing unique nodes per step; creating a smaller graph including only marker identifiers as a network; transposing the network on the first image; and deterministically deriving underlying graph structure and associated text information in the document by applying the vision-based algorithm and the network-based algorithm.

According to exemplary embodiments, in implementing the first algorithm, the instructions, when executed, may cause the processor to further perform the following: applying a flood fill algorithm onto the smoothed image, wherein continuous blocks of pixels form the nodes, and wherein the nodes represent thicker objects.

According to exemplary embodiments, in implementing the second algorithm, the instructions, when executed, may cause the processor to further perform the following: applying morphological operations with 1×1 kernel.

According to exemplary embodiments, the instructions, when executed, may cause the processor to further perform the following: applying a dilation algorithm that adds pixels to the boundaries of objects in the smoothed image and creating a new image by overlapping a kernel at each pixel, wherein when any pixel in an N×N kernel is 1, that new pixel is 1, thereby expanding white regions when any white pixel falls in a kernel space.

According to exemplary embodiments, the instructions, when executed, may cause the processor to further perform the following: applying an erosion algorithm in which a new image is created by overlapping an N×N kernel over each pixel, wherein when all pixels under the kernel are 1, it places a 1, and when any pixel is 0, the whole value is 0, thereby eroding away the node boundaries of objects and leaves only solid regions of white pixels.

According to exemplary embodiments, in applying an adaptive threshold algorithm, the instructions, when executed, may cause the processor to further perform the following: implementing an adaptive mean threshold algorithm; and implementing Otsu thresholding algorithm to return a single intensity threshold that separate pixels into two partitions which minimizes variance between the two partitions.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
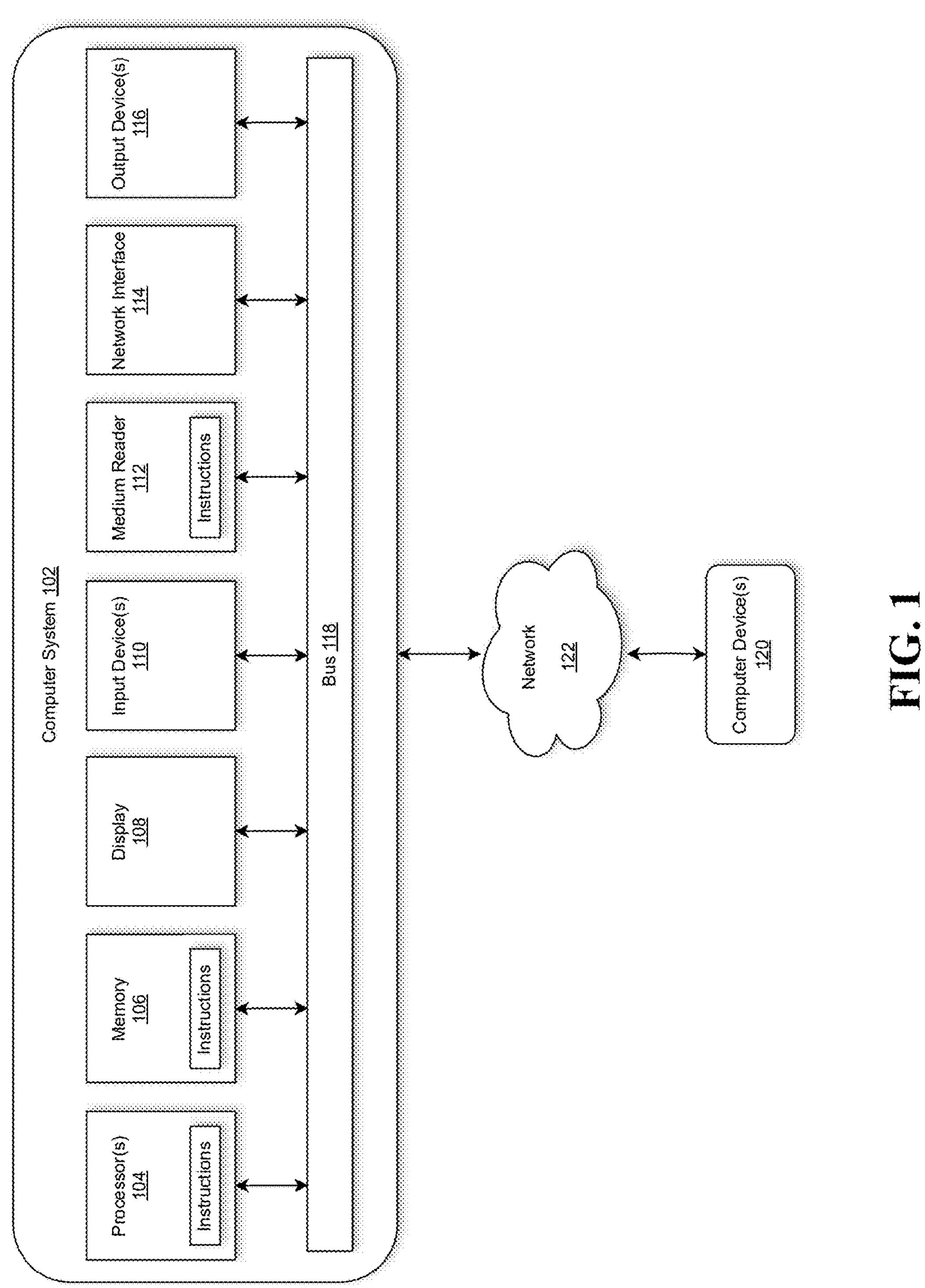
FIG. 1 illustrates a computer system for implementing a platform, language, database, and cloud agnostic vision-assisted network discovery module configured to implement a vision-assisted network discovery algorithm to discover, extract, and organize graph structured diagrams in visual mediums into a structured representation in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic vision-assisted network discovery module configured to implement a vision-assisted network discovery algorithm to discover, extract, and organize graph structured diagrams in visual mediums into a structured representation in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the vision-assisted network discovery module implemented by the system 100 may be platform, language, database, and cloud agnostic that may allow for consistent easy orchestration and passing of data through various components to output a desired result regardless of platform, browser, language, database, and cloud environment by writing programs accordingly. Since the disclosed process, according to exemplary embodiments, is platform, language, database, browser, and cloud agnostic, the vision-assisted network discovery module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
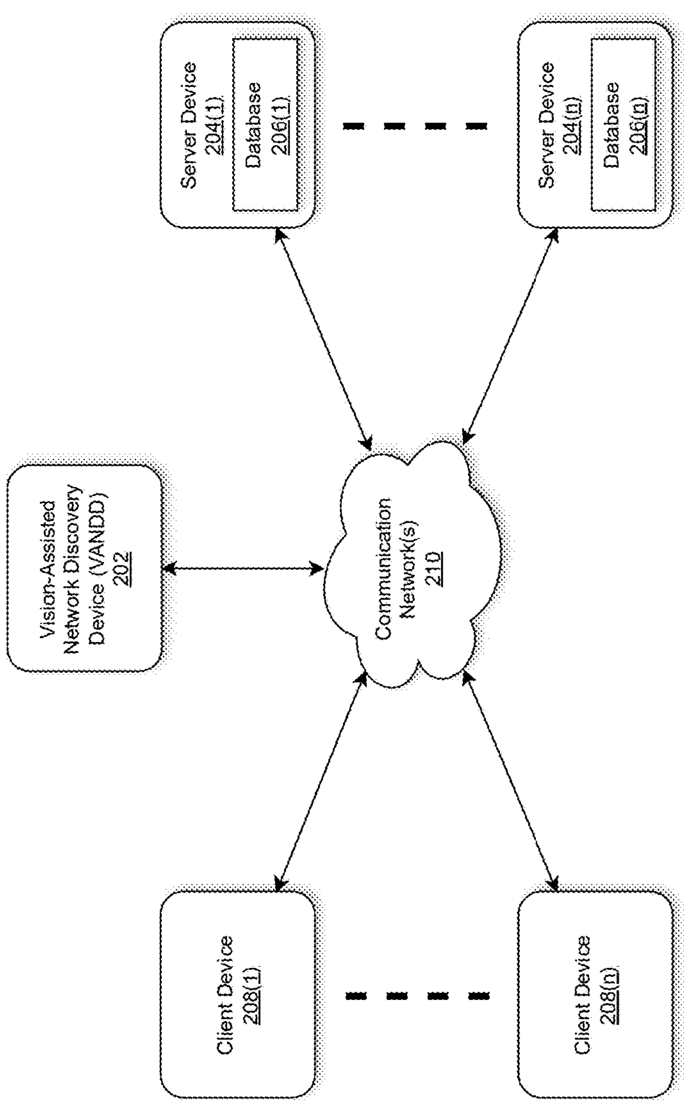
FIG. 2 illustrates an exemplary diagram of a network environment with a platform, language, database, and cloud agnostic vision-assisted network discovery device in accordance with an exemplary embodiment.

Referring to FIG. 2, a schematic of an exemplary network environment 200 for implementing a language, platform, database, and cloud agnostic vision-assisted network discovery device (VANDD) of the instant disclosure is illustrated.

According to exemplary embodiments, the above-described problems associated with conventional tools may be overcome by implementing a VANDD 202 as illustrated in FIG. 2 that may be configured for implementing a platform, language, database, and cloud agnostic vision-assisted network discovery module configured to implement a vision-assisted network discovery algorithm to discover, extract, and organize graph structured diagrams in visual mediums into a structured representation, but the disclosure is not limited thereto. For example, the VANDD 202, according to an embodiment, may be configured to implement a vision-assisted network discovery algorithm in a manner such that one may understand space (i.e., empty space or blank space or negative space) in documents (i.e., PDFs, images, HTML, etc.) which then may help to understand structure of flow charts, organizational charts, tables, or of the document itself, but the disclosure is not limited thereto.

The VANDD 202 may have one or more computer system 102*s*, as described with respect to FIG. 1, which in aggregate provide the necessary functions.

The VANDD 202 may store one or more applications that can include executable instructions that, when executed by the VANDD 202, cause the VANDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the VANDD 202 itself, may be located in virtual server(s) running in a cloud-based computing environment rather than being tied to one or more specific physical network computing devices. Also, the application(s) may be running in one or more virtual machines (VMs) executing on the VANDD 202. Additionally, in one or more embodiments of this technology, virtual machine(s) running on the VANDD 202 may be managed or supervised by a hypervisor.

In the network environment 200 of FIG. 2, the VANDD 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the VANDD 202, such as the network interface 114 of the computer system 102 of FIG. 1, operatively couples and communicates between the VANDD 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the VANDD 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The VANDD 202 may be a standalone device or integrated with one or more other devices or apparatuses, such as one or more of the server devices 204(1)-204(*n*), for example. In one particular example, the VANDD 202 may be hosted by one of the server devices 204(1)-204(*n*), and other arrangements are also possible. Moreover, one or more of the devices of the VANDD 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the VANDD 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

According to exemplary embodiments, the client devices 208(1)-208(*n*) in this example may include any type of computing device that can facilitate the implementation of the VANDD 202 that may efficiently provide a platform for implementing a platform, language, database, and cloud agnostic vision-assisted network discovery module configured to implement a vision-assisted network discovery algorithm to discover, extract, and organize graph structured diagrams in visual mediums into a structured representation, but the disclosure is not limited thereto.

The client devices 208(1)-208(*n*) may run interface applications, such as standard web browsers or standalone client applications, which may provide an interface to communicate with the VANDD 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the VANDD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the VANDD 202, the server devices 204(1)-204(*n*), or the client devices 208(1)-208(*n*), for example, may be configured to operate as virtual instances on the same physical machine. For example, one or more of the VANDD 202, the server devices 204(1)-204(*n*), or the client devices 208(1)-208(*n*) may operate on the same physical device rather than as separate devices communicating through communication network(s) 210. Additionally, there may be more or fewer VANDDs 202, server devices 204(1)-204(*n*), or client devices 208(1)-208(*n*) than illustrated in FIG. 2. According to exemplary embodiments, the VANDD 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
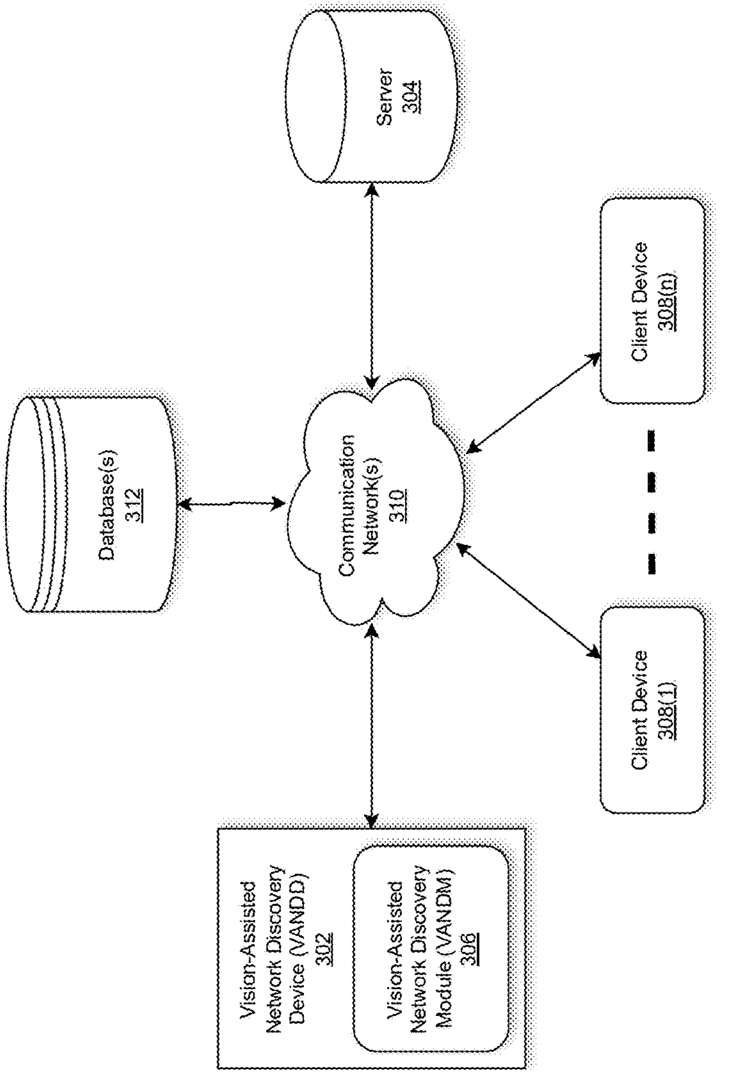
FIG. 3 illustrates a system diagram for implementing a platform, language, database, and cloud agnostic vision-assisted network discovery device having a platform, language, database, and cloud agnostic vision-assisted network discovery module in accordance with an exemplary embodiment.

FIG. 3 illustrates a system diagram for implementing a platform, language, and cloud agnostic VANDD having a platform, language, database, and cloud agnostic vision-assisted network discovery module (VANDM) in accordance with an exemplary embodiment.

As illustrated in FIG. 3, the system 300 may include an VANDD 302 within which an VANDM 306 is embedded, a server 304, a database(s) 312, a plurality of client devices 308(1) . . . 308(*n*), and a communication network 310.

According to exemplary embodiments, the VANDD 302 including the VANDM 306 may be connected to the server 304, and the database(s) 312 via the communication network 310. The VANDD 302 may also be connected to the plurality of client devices 308(1) . . . 308(*n*) via the communication network 310, but the disclosure is not limited thereto. The database(s) 312 may include rule database.

According to exemplary embodiment, the VANDD 302 is described and shown in FIG. 3 as including the VANDM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

According to exemplary embodiments, the VANDM 306 may be configured to receive real-time feed of data from the plurality of client devices 308(1) . . . 308(*n*) and secondary sources via the communication network 310.

As may be described below, the VANDM 306 may be configured to: implement a vision-based algorithm that may include the following, but the disclosure is not limited thereto: converting a diagram identified from the document into a first image; converting the first image into a grayscale image; applying an adaptive threshold algorithm to the grayscale image and removing noise and smoothing the grayscale image and generating a smoothed image; identifying contours from the smoothed image; implementing a first algorithm onto the smoothed image to determine a bounded area connected to a given node among a plurality of node pixels within the identified contours; implementing a second algorithm to expand the node pixels to be thicker thereby expanding out node boundaries of objects themselves; utilizing connected components to individually label regions of nodes as a single entity; implementing a watershed algorithm to apply the labels onto the grayscale image; determining contour of each node; implement a network-based algorithm that may include that may include the following, but the disclosure is not limited thereto: selecting, for each node, a middle pixel that is still a valid marker; aggregating all node pixels with same value as one object; combining, given the nodes, every pair; launching a graph search between two adjacent nodes; recording a path and intermediate nodes traversed; condensing, given the path, consecutive pixel values into a single item providing unique nodes per step; creating a smaller graph including only marker identifiers as a network; transposing the network on the first image; and deterministically derive underlying graph structure and associated text information in the document by applying the vision-based algorithm and the network-based algorithm, but the disclosure is not limited thereto.

The plurality of client devices 308(1) . . . 308(*n*) are illustrated as being in communication with the VANDD 302. In this regard, the plurality of client devices 308(1) . . . 308(*n*) may be "clients" (e.g., customers) of the VANDD 302 and are described herein as such. Nevertheless, it is to be known and understood that the plurality of client devices 308(1) . . . 308(*n*) need not necessarily be "clients" of the VANDD 302, or any entity described in association therewith herein. Any additional or alternative relationship may exist between either or both of the plurality of client devices 308(1) . . . 308(*n*) and the VANDD 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(*n*) may communicate with the VANDD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The VANDD 302 may be the same or similar to the VANDD 202 as described with respect to FIG. 2, including any features or combination of features described with respect thereto.

Figure 4:
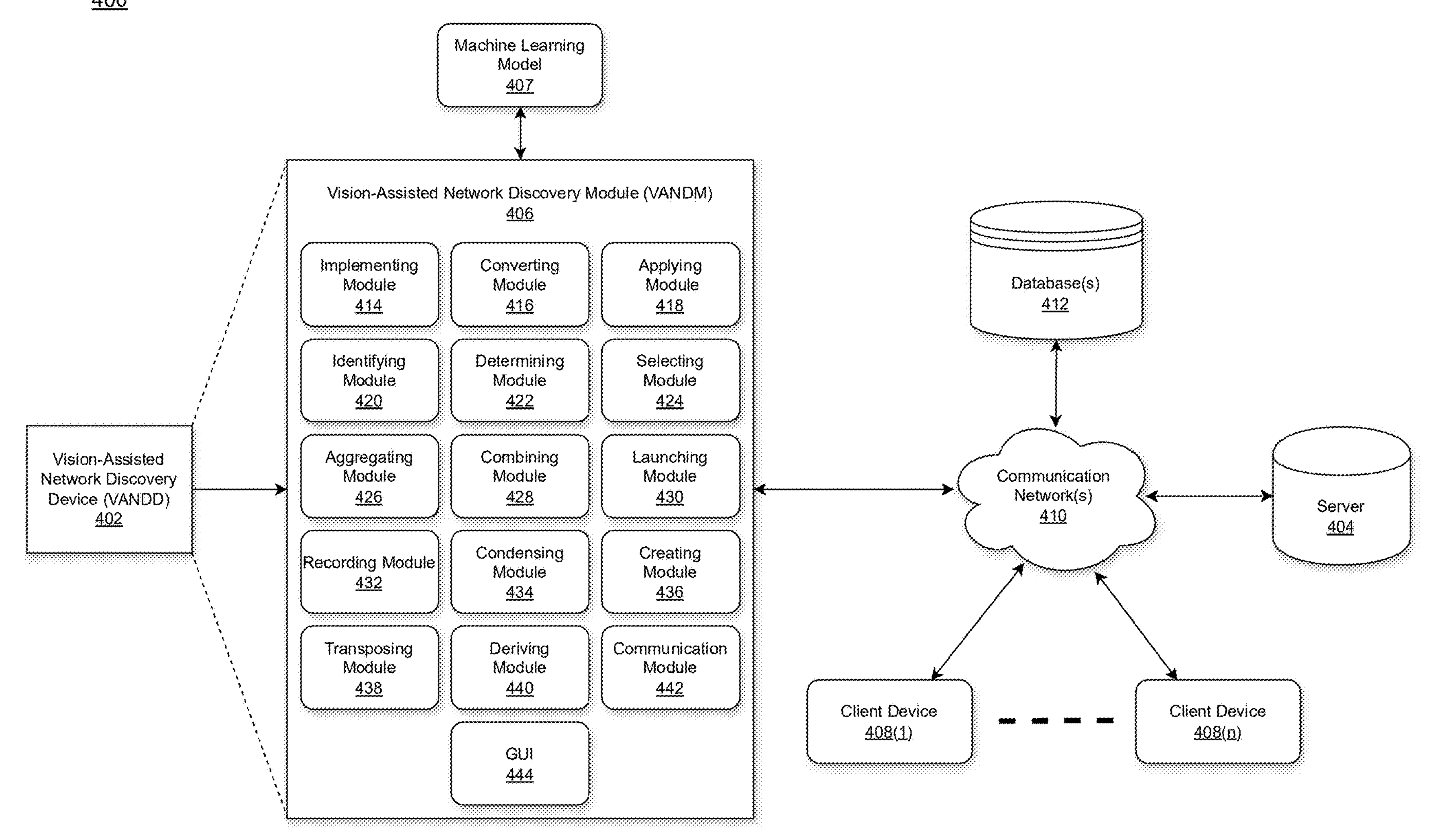
FIG. 4 illustrates a system diagram for implementing a platform, language, database, and cloud agnostic vision-assisted network discovery module of FIG. 3 in accordance with an exemplary embodiment.

FIG. 4 illustrates a system diagram for implementing a platform, language, database, and cloud agnostic VANDM of FIG. 3 in accordance with an exemplary embodiment.

According to exemplary embodiments, the system 400 may include a platform, language, database, and cloud agnostic VANDD 402 within which a platform, language, database, and cloud agnostic VANDM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the VANDD 402 including the VANDM 406 may be connected to the server 404, a machine learning model 407 (i.e., an LLM), and the database(s) 412 via the communication network 410. The VANDD 402 may also be connected to the plurality of client devices 408(1)-408(*n*) via the communication network 410, but the disclosure is not limited thereto. The VANDM 406, the server 404, the plurality of client devices 408(1)-408(*n*), the database(s) 412, the communication network 410 as illustrated in FIG. 4 may be the same or similar to the VANDM 306, the server 304, the plurality of client devices 308(1)-308(*n*), the database(s) 312, the communication network 310, respectively, as illustrated in FIG. 3.

For example, according to exemplary embodiments, the VANDM 406 may be configured to implement a vision-assisted network discovery algorithm to discover, extract, and organize graph structured diagrams in visual mediums into a structured representation, but the disclosure is not limited thereto. For example, the VANDM 406, according to an embodiment, may be configured to implement a vision-assisted network discovery algorithm in a manner such that one may understand space (i.e., empty space or blank space or negative space) in documents (i.e., PDFs, images, HTML, etc.) which then may help to understand structure of flow charts, organizational charts, tables, or of the document itself, but the disclosure is not limited thereto.

For example, diagrams encode hierarchal relationships and ordering through spatial features that may not be explicitly captured through standard optical character recognition programs and natural language algorithms. According to an embodiment, by taking a multimodal approach, as implemented by the VANDM 406 as disclosed herein, may be configured to implement a vision-assisted network discovery algorithm that may be able to deterministically derive the underlying graph structure and associated text information per vertex node through a combination of vision and network algorithms, thereby allowing encoding of graph content and reasoning into downstream applications such as LLMs (i.e., machine learning model 407) inputs, graphical question-answering knowing the full structure and how to traverse, and information extraction tasks, quickly encoding relationships otherwise difficult to observe, inputting to the machine learning model 407 in text format (converting the OCR text and network structure into a text structured JSON object for an LLM input), discovering dependencies and search graphs by relationships, but the disclosure is not limited thereto. For example, the VANDM 406 may implement an OCR algorithm for text fields, and then may isolate which piece of text belongs to which node by examining the spatial coordinates of the text against bounding box of the node and may execute cross-page resolution. For example, in executing cross-page resolution, if each page is a sub-image of a larger partitioned image, then one may use image stitching algorithms to optimally fit each sub image to form a composition. And if each page references another section of the graph indirectly ("wormhole"), one may encode those connections as wormhole connections.

Details of the VANDM 406 is provided below with corresponding modules that may be configured to, in combination, results in implementing a vision-assisted network discovery algorithm to discover, extract, and organize graph structured diagrams in visual mediums into a structured representation as illustrated in FIGS. 4-24.

According to exemplary embodiments, as illustrated in FIG. 4, the VANDM 406 may include an implementing module 414, a converting module 416, an applying module 418, an identifying module 420, a determining module 422, a selecting module 424, an aggregating module 426, a combining module 428, a launching module 430, a recording module 432, a condensing module 434, a creating module 436, a transposing module 438, a deriving module 440, a communication module 442, and a GUI 444. According to exemplary embodiments, interactions and data exchange among these modules included in the VANDM 406 provide the advantageous effects of the disclosed invention. Functionalities of each module of FIG. 4 may be described in detail below with reference to FIGS. 5-21.

According to exemplary embodiments, each of the implementing module 414, converting module 416, applying module 418, identifying module 420, determining module 422, selecting module 424, aggregating module 426, combining module 428, launching module 430, recording module 432, condensing module 434, creating module 436, transposing module 438, deriving module 440, and the communication module 442 of the VANDM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the implementing module 414, converting module 416, applying module 418, identifying module 420, determining module 422, selecting module 424, aggregating module 426, combining module 428, launching module 430, recording module 432, condensing module 434, creating module 436, transposing module 438, deriving module 440, and the communication module 442 of the VANDM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the implementing module 414, converting module 416, applying module 418, identifying module 420, determining module 422, selecting module 424, aggregating module 426, combining module 428, launching module 430, recording module 432, condensing module 434, creating module 436, transposing module 438, deriving module 440, and the communication module 442 of the VANDM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the VANDM 406 of FIG. 4 may also be implemented by Cloud based deployment.

According to exemplary embodiments, each of the implementing module 414, converting module 416, applying module 418, identifying module 420, determining module 422, selecting module 424, aggregating module 426, combining module 428, launching module 430, recording module 432, condensing module 434, creating module 436, transposing module 438, deriving module 440, and the communication module 442 of the VANDM 406 of FIG. 4 may be called via corresponding API, but the disclosure is not limited thereto.

According to exemplary embodiments, the process implemented by the VANDM 406 may be executed via the communication module 442 and the communication network 410, which may comprise plural networks as described above. For example, in an exemplary embodiment, the various components of the VANDM 406 may communicate with the server 404, and the database(s) 412 via the communication module 442 and the communication network 410 and the results (i.e., images in each steps as illustrated in FIGS. 5-21, as well as the final graph structure, etc.) may be displayed onto the GUI 444. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
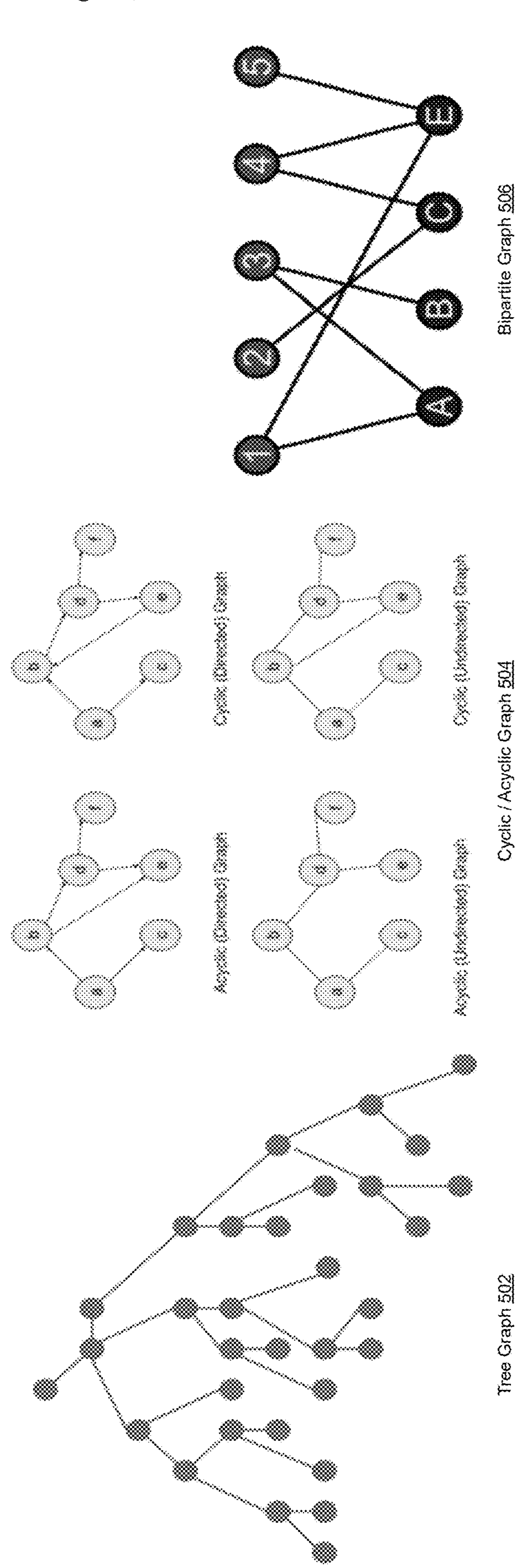
FIG. 5 illustrates an exemplary graph that may be encoded by the platform, language, database, and cloud agnostic vision-assisted network discovery module of FIG. 4 in accordance with an exemplary embodiment.
Figure 5:

For example, FIG. 5 illustrates an exemplary graph 500 that may be encoded as a diagram by the platform, language, database, and cloud agnostic VANDM 406 of FIG. 4 in accordance with an exemplary embodiment. There may be several types of graphs, i.e., direction, cycles, planar, etc., that may be encoded as a diagram.

For example, diagrams may be directional (such that there is a source node and a target node, denoting A->B) or undirected (such that the relationship between two linked nodes is mutual, such as a friendship graph between A<->B).

Graphs may also be a tree (any two nodes are connected by exactly one path, therefore acyclic (no cycles)), directed acyclic graph (where nodes may be ordered by their edges such that one may not traverse a previous node, i.e., the path moves forward down the graph with no backtracking cycles), a forest (a collection of non-connected trees), a bipartite graph (where the vertex set may be divided into distinct sets (investor graphs)).

A planar graph may be a diagram/graph where every node and edge of the graph can be drawn without overlaps. A non-planar graph may be a structure where overlaps occur.

As illustrated in FIG. 5, the graph 500 may include a tree graph 502, one or more cyclic/acyclic graph 504, and a bipartite graph 506, but the disclosure is not limited thereto.

During the first step in a preparation phase, the VANDM 406 may be convert diagrams into a three channel color image (RBG image). For example, if the file is an image, no alterations may be required. If the file is a PDF, the VANDM 406 may convert the PDF document to an image. And if an HTML file, the VANDM 406 may extract the image or convert directly to an image after rendering.

During the second step in the preparation phase, the VANDM 406 may load a three channel RGB image per diagram. For multipage diagrams, the VANDM 406 may store each page as a single instance of a larger sequence.

Referring back to FIG. 4, the implementing module 414 may be configured to implement a vision-based algorithm that may include executing the following functionalities, but the disclosure is not limited thereto.

According to exemplary embodiments, the converting module 416 may be configured to convert a diagram identified from the document into a first image and convert the first image into a grayscale image (single-channel image where each pixel has a single value between 0-255, where 0 is black, and 255 is white) (referred to as step 1). The applying module 418 may be configured to apply an adaptive threshold algorithm to the grayscale image and remove noise and smooth the grayscale image and generate a smoothed image.

Figure 6:
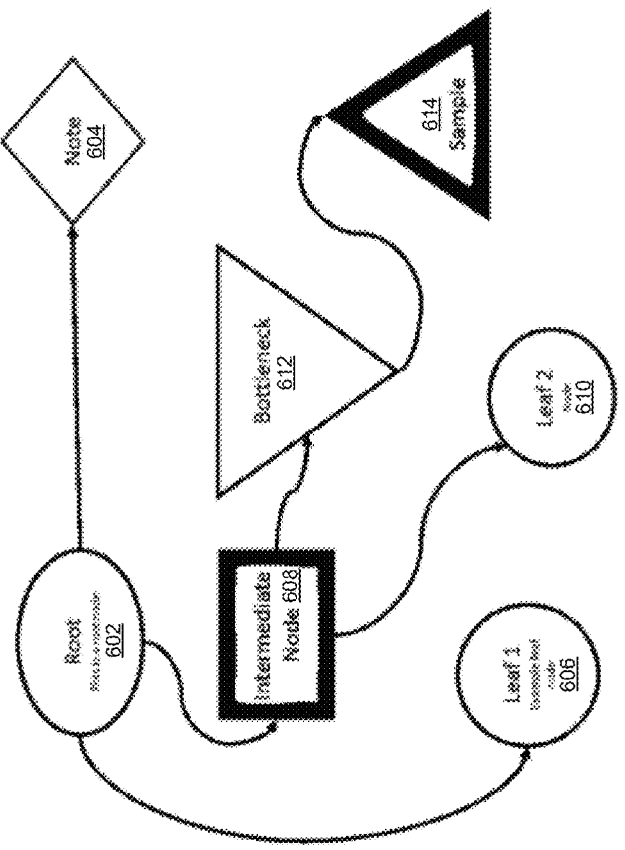
FIG. 6 illustrates an exemplary threshold image after removing noise and smoothing a grayscale image in accordance with an exemplary embodiment.

For example, FIG. 6 illustrates an exemplary threshold image 600 displayed onto the GUI 444 after removing noise and smoothing a grayscale image in accordance with an exemplary embodiment. The image 600 illustrates a root node 602, note 604, leaf node 1 606, intermediate node 608, leaf node 2 610, bottleneck 612, and sample 614.

According to exemplary embodiments, the VANDM 406 may apply an adaptive thresholds algorithm in the smoothing and noise reduction phase.

Adaptive Mean threshold, when takes the average pixel value in a 41×41 pixel neighborhood, subtracts a constant C from it (c=10 here) then checks if original pixel at (x, y)>(41×41 neighborhood average−10)->255 (white) else 0 (black). The VANDM 406 may also utilize Otsu thresholding on a blurred binary image to smooth out noise. Otsu thresholding determines a threshold that reduces the variance between two partitions. For example, it finds a threshold to separate the two major peaks of pixel values.

According to exemplary embodiments, the VANDM 406 may also apply a morphological operations with a 1×1 kernel in the smoothing and noise reduction phase (referred to as step 2). For example, the VANDM 406 may apply an "OPENING" followed by a "CLOSING" operation in the noise reduction phase. Later, in the determination of background, the VANDM 406 utilizes a dilation operation. Opening is an EROSION followed by DILATION—useful to remove white noise in a black background. Closing is a DILATION followed by EROSION—useful for closing small holes in foreground objects or small black points in white objects. This closing operation thus removes small particles and noise from scanned images to create a clearer picture.

DILATION is the process of creating a new image by overlapping a kernel at each pixel. If any pixel in a N×N kernel is 1->that new pixel is 1. It expands white regions if any white pixel falls in the kernel space.

EROSION is the process of creating a new image by overlapping a kernel (N×N square matrix) over each pixel. If all pixels under the kernel are 1—it places a 1. If any pixel is 0—then the whole value is 0. This erodes away the boundaries of objects and leaves only solid regions of white pixels.

According to exemplary embodiments, the VANDM 406 may utilize a 2×2 for noise reduction, a 7×7 in the flood fill phase, and a 7×7 in the noise removal step after separating the nodes, but the disclosure is not limited thereto.

The VANDM 406 may smooth the original grayscale image by applying a binary threshold with a threshold of 180; then applying an Otsu thresholding algorithm; applying a Gaussian Blur (averages the pixels in a square window); and applying a secondary Otsu thresholding on the blurred image. Details on algorithms of application of Gaussian Blur and Otsu thresholding may include the following.

Gaussian Blur—the VANDM 406 may take a N×N kernel with a gaussian weight and average the pixels in that region. In contrast to a regular mean (equal weight), gaussians weight the center higher over the boundary.

Otsu thresholding—it automatically determines a global threshold that separates any bimodal (two peak) histogram of pixel values such that the variance within each partition is minimized. Essentially placing a divider between two regions of values.

Figure 10:
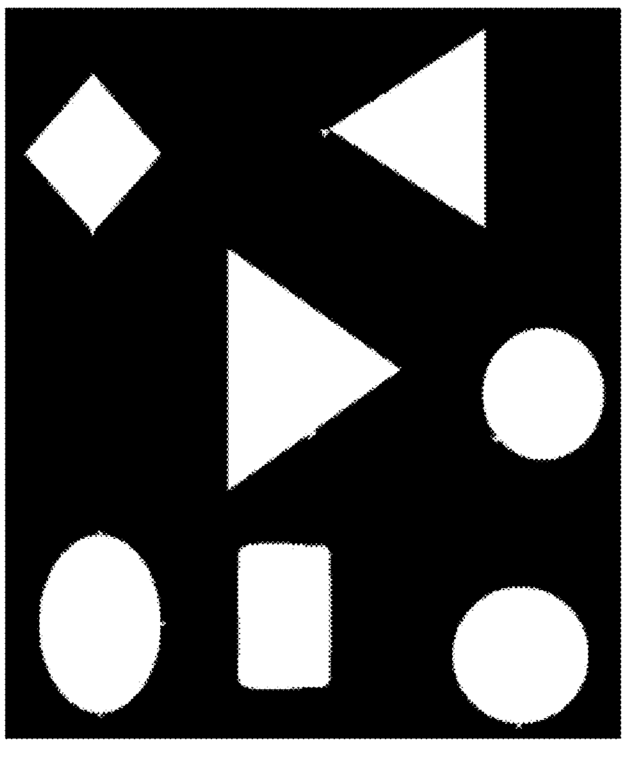
FIG. 10 illustrates an exemplary image after applying Bitwise OR operation in accordance with an exemplary embodiment.

Finally, the VANDM 406 may utilize a bitwise OR operation between the smoothed image and the artifact generated in step 2 (applying morphological operations with a 1×1 kernel) as disclosed above. For example, FIG. 10 illustrates an exemplary image 1000 after applying Bitwise OR operation in accordance with an exemplary embodiment.

According to exemplary embodiments, the identifying module 420 may be configured to identify/discover contours (objects with significant boundaries representing enclosed sets of pixels that are distinct from the background) from the smoothed image (referred to as step 3). The VANDM 406 may filter out contours that have an area less than 1e−3*total_area (too small); and filter out contours greater than 0.10*total_area (too large). Separately, from the original grayscale image, create a copy of it but filled with 0 values pixels (all black) (referred to as step 4).

For example, if the contour area is smaller that 0.001*total area, or larger than 0.1*total area (effectively all contours must have an area less than 10% of the total image area, and above 0.1%), the VANDM 406 filters out accordingly.

If the SOLIDITY is greater than 0.8—the VANDM 406 may keep it. SOLIDITY is the contour area divided by the convex hull area. The convex hull is the shape formed when fixing convexity defects in an object (for example, the area between a person's fingers is a concave curve, while curves that bulge out are convex). Thus, a convex hull is the best approximation of the shape of a contour object without any defects or curves that curve into the object. The VANDM 406 implements this operation for invalidating interior regions of graphs that touch surrounding nodes. Most shapes that do not fold inwards are 1-1 with a convex hull.

According to exemplary embodiments, at step 5, the VANDM 406 may draw the contours from step 3 onto the empty image in step 4. At step 6, the VANDM 406 may create, by utilizing the creating module 436, a new image that is the BITWISE AND of: a. the image from Step 5 (image with just the outlined contours); b. BITWISE_NOT of the threshold image generated in step 2.

Figure 7:
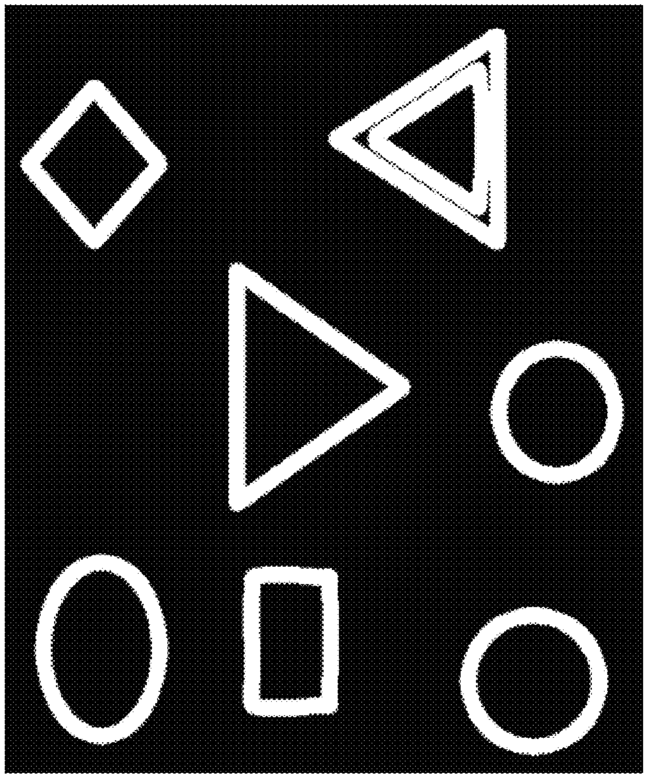
FIG. 7 illustrates an exemplary black and white image after applying dilation algorithm in accordance with an exemplary embodiment.
Figure 7:
Figure 8:
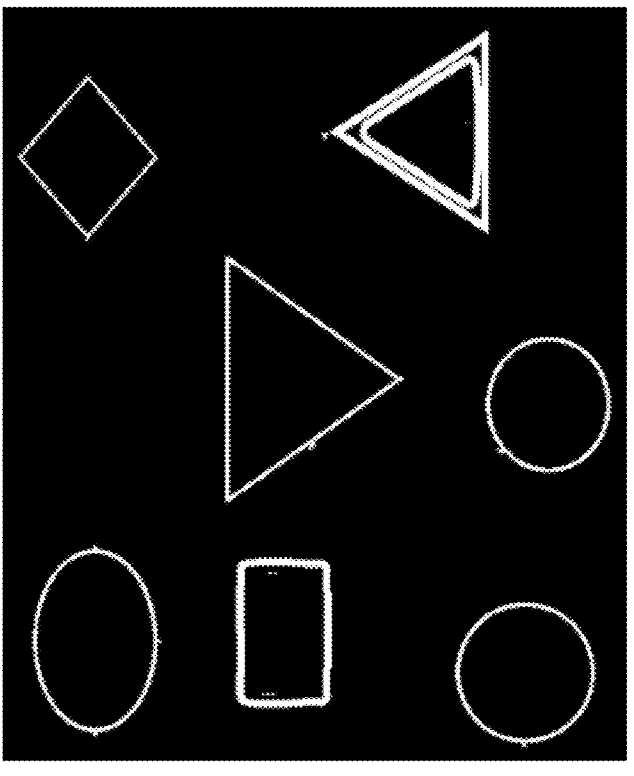
FIG. 8 illustrates an exemplary image after applying Bitwise AND operation in accordance with an exemplary embodiment.

For example, FIG. 7 illustrates an exemplary black and white image 700 after applying dilation algorithm in accordance with an exemplary embodiment. FIG. 8 illustrates an exemplary image 800 after applying Bitwise AND operation in accordance with an exemplary embodiment. FIG. 10 illustrates an exemplary image 1000 after applying Bitwise OR operation in accordance with an exemplary embodiment.

Figure 9:
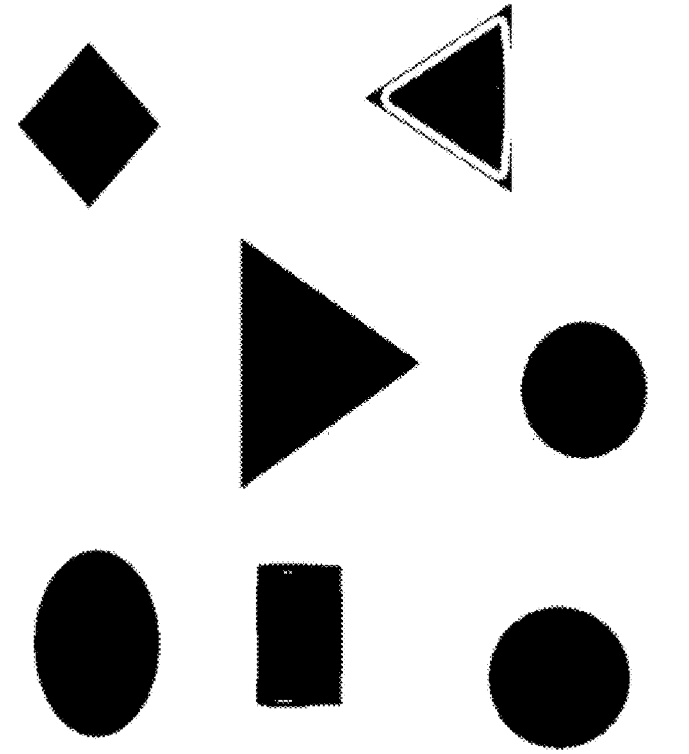
FIG. 9 illustrates an exemplary image after applying Flood fill algorithm in accordance with an exemplary embodiment.

At step 7, from the image in step 6, the VANDM 406 may apply a flood fill operation (from a start vertex flood the image with a certain value until hitting a barrier, i.e., a pixel of a different value) from four separate start points (each corner of the image). For example, FIG. 9 illustrates an exemplary image 900 after applying flood fill algorithm in accordance with an exemplary embodiment.

Figure 11:
FIG. 11 illustrates an exemplary image after dilating nodes in accordance with an exemplary embodiment.
Figure 11:

At step 8, the VANDM 406 may invert the flooded image in step 7. At step 9, the VANDM 406 may create a new image from the BITWISE AND of step 8 and step 6. At step 10, the VANDM 406 may dilate (expand the white pixels given overlap with a 7×7 kernel) the image from step 6. For example, FIG. 11 illustrates an exemplary image 1100 after dilating nodes in accordance with an exemplary embodiment.

Figure 12:
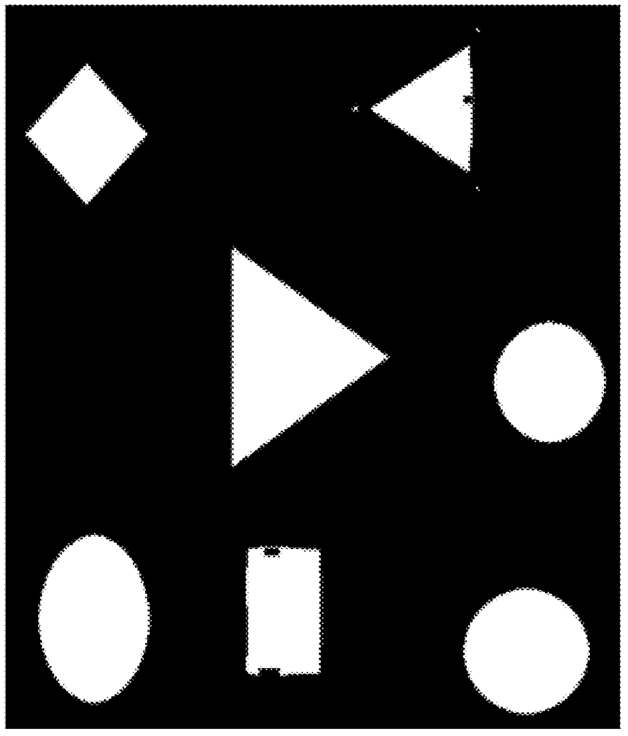
FIG. 12 illustrates an exemplary image after separating nodes in accordance with an exemplary embodiment.

At step 11, the VANDM 406, may subtract step 10 from step 9, thereby isolating the nodes from the connections and edges. For example, FIG. 12 illustrates an exemplary image 1200 after separating nodes in accordance with an exemplary embodiment.

Figure 13:
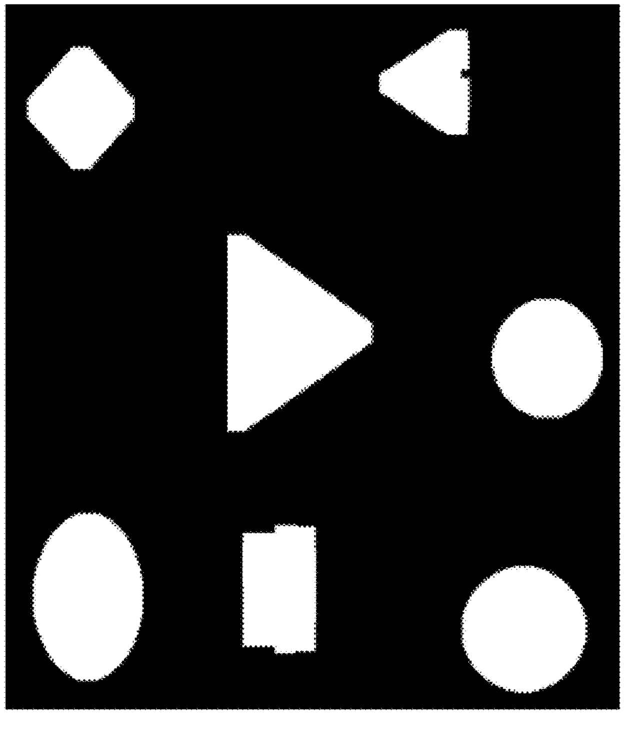
FIG. 13 illustrates an exemplary image after applying opening operation in accordance with an exemplary embodiment.
Figure 13:

At step 12, with a 7×7 kernel, the VANDM 406, may utilize a morphological opening operation on step 11 to remove noise. FIG. 13 illustrates an exemplary image 1300 after applying opening operation in accordance with an exemplary embodiment.

Figure 14:
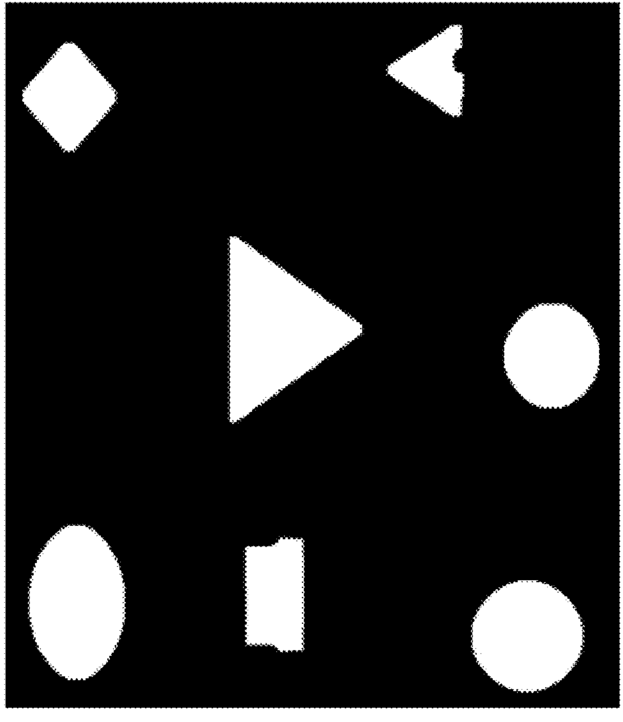
FIG. 14 illustrates an exemplary image after applying foreground transform operation in accordance with an exemplary embodiment.

At step 13, the VANDM 406 may dilate the image from step 12 to get the background. At step 14, the VANDM 406 may utilize a distance transform to get the sure foreground (pixels far enough from the background to be 100% certain the foreground, aka a node), then threshold the image to isolate distances above 15% of the maximum distance. For example, FIG. 14 illustrates an exemplary image 1400 after applying foreground transform operation in accordance with an exemplary embodiment.

At step 15, the VANDM 406 may subtract step 14 from step 13 to find the nodes. At step 16, the VANDM 406 may utilize connected components to individually label regions of nodes as a single entity. At step 17, the VANDM 406 may utilize the watershed algorithm to apply these labels onto of the grayscale image. At step 18, the VANDM 406 may obtain the contour for each node (each connected component) by the following algorithms: a) remove nodes that do not have a good solidity (contour area/convex hull area); and b) if accepted, dilate the node mask and add it to an empty image to build up a single image of labeled nodes. At step 19, the VANDM 406 may discover the lines by BITWISE NOT of the image in step 2. At step 20, with a 5×5 kernel dilate step 19, the VANDM 406 may get the pixel values for nodes, then set isolate the lines and add them as a special label. At step 21, the VANDM 406 may resize the mask to 15% the original size.

According to exemplary embodiments, at step 22, given step 21, for each node the VANDM 406 may: a) select the middle pixel that is still a valid marker; and b) aggregate all node pixels with same value as one object. At step 23, given the nodes, adjacency list from step 22, the VANDM 406 may: a) make every pairwise combination; b) launch a graph search between the two nodes; and c) record the path and intermediate nodes traversed. At step 24, given the raw path in step 23, the VANDM 406 may condense consecutive pixel values into a single item, such that to generate unique nodes per step. At step 25, the VANDM 406 may generate a smaller graph of just the maker identifiers. At step 26, the VANDM 406 may store the network and draw it transposed on the original image.

Figure 15:
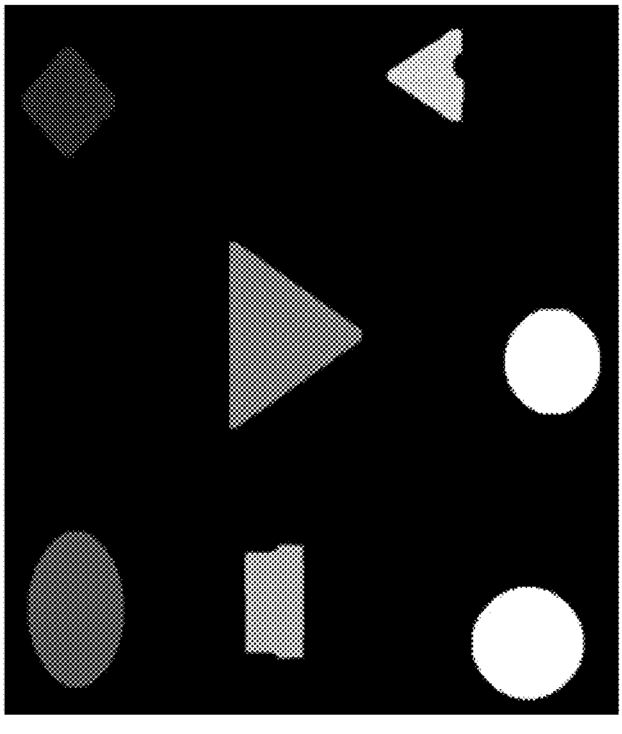
FIG. 15 illustrates an exemplary image showing markers from connected components in accordance with an exemplary embodiment.
Figure 17:
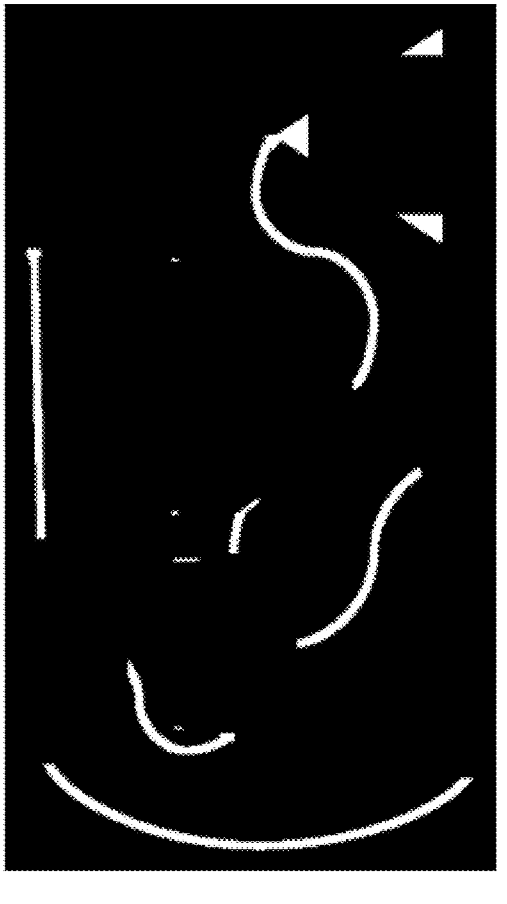
FIG. 17 illustrates an exemplary image showing discovery of lines in accordance with an exemplary embodiment.
Figure 16:
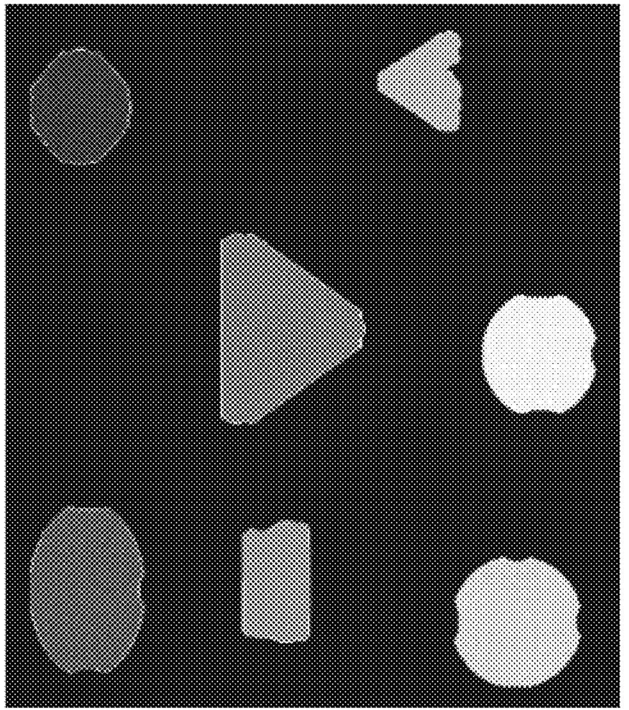
FIG. 16 illustrates an exemplary image after normalizing markers in accordance with an exemplary embodiment.
Figure 19:
FIG. 19 illustrates an exemplary image after down sampling in accordance with an exemplary embodiment.
Figure 19:
Figure 19:
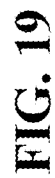
Figure 18:
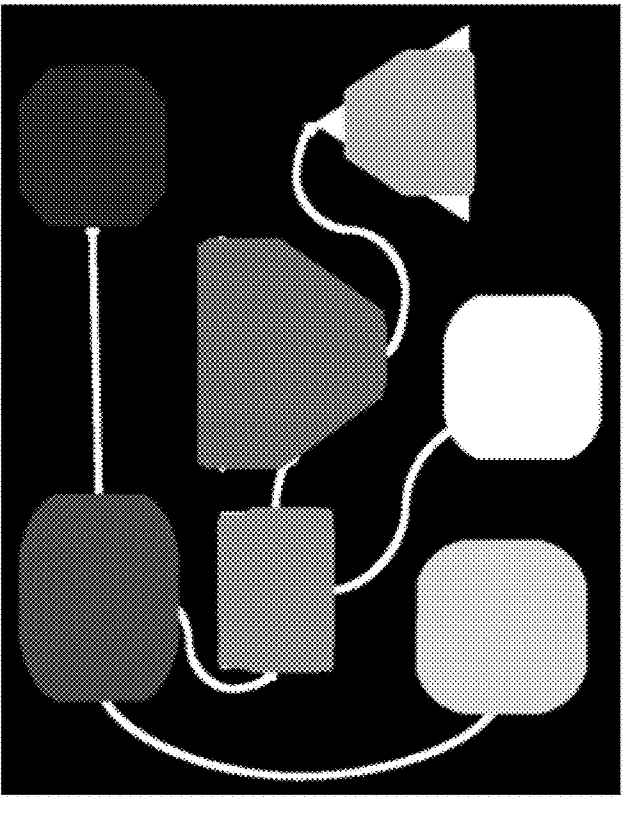
FIG. 18 illustrates an exemplary image after adding lines to markers in accordance with an exemplary embodiment.
Figure 21:
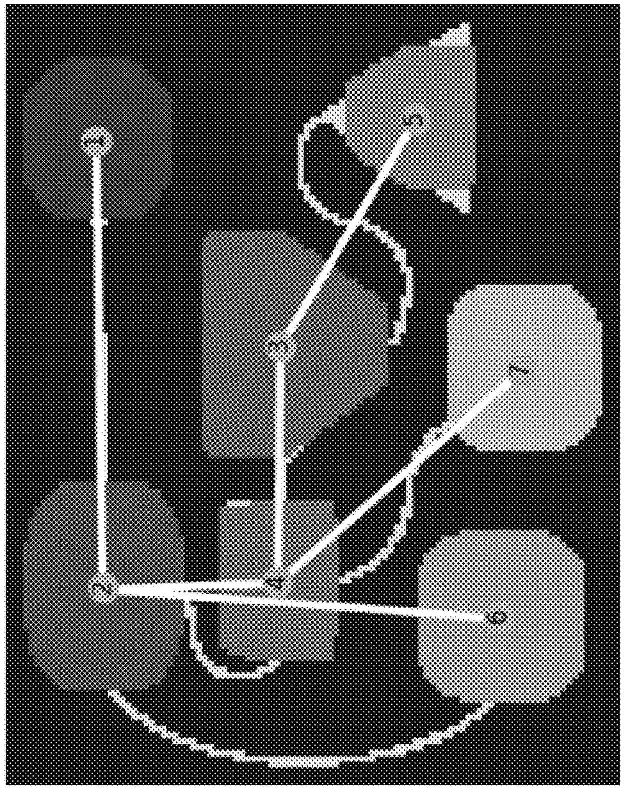
FIG. 21 illustrates an exemplary image after overlaying the generated graph network of FIG. 20 onto the original image in accordance with an exemplary embodiment.
Figure 20:
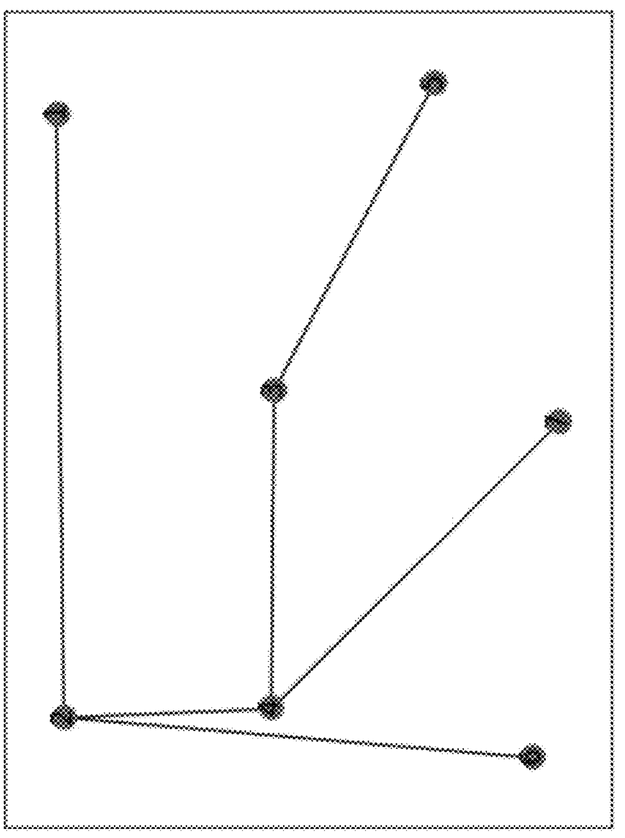
FIG. 20 illustrates an exemplary image of generated graph network in accordance with an exemplary embodiment.

For example, FIG. 15 illustrates an exemplary image 1500 showing markers from connected components in accordance with an exemplary embodiment. FIG. 16 illustrates an exemplary image 1600 after normalizing markers in accordance with an exemplary embodiment. FIG. 17 illustrates an exemplary image 1700 showing discovery of lines in accordance with an exemplary embodiment. FIG. 18 illustrates an exemplary image 1800 after adding lines to markers in accordance with an exemplary embodiment. FIG. 19 illustrates an exemplary image 1900 after down sampling in accordance with an exemplary embodiment. FIG. 20 illustrates an exemplary image 2000 of generated graph network in accordance with an exemplary embodiment. FIG. 21 illustrates an exemplary image 2100 after overlaying the generated graph network of FIG. 20 onto the original image in accordance with an exemplary embodiment.

According to exemplary embodiments, the vision-based algorithm implemented by VANDM 406 as disclosed herein may include steps 1-21 as mentioned above, but the disclosure is not limited thereto. And the network-based algorithm implemented by VANDM 406 as disclosed herein may include steps 22-26 as mentioned above, but the disclosure is not limited thereto.

For example, referring back to FIG. 4, the implementing module 414 may be further configured to implement a first algorithm onto the smoothed image to determine a bounded area connected to a given node among a plurality of node pixels within the identified contours; and implement a second algorithm to expand the node pixels to be thicker thereby expanding out node boundaries of objects themselves; and utilizing connected components to individually label regions of nodes as a single entity.

According to exemplary embodiments, in implementing the first algorithm, the applying module 418 may be configured to apply a flood fill algorithm as mentioned earlier onto the smoothed image, wherein continuous blocks of pixels form the nodes, and wherein the nodes represent thicker objects.

According to exemplary embodiments, in implementing the second algorithm, the applying module 418 may be further configured to apply morphological operations with 1×1 kernel. For example, the applying module 418 may apply a dilation algorithm as mentioned earlier that adds pixels to the boundaries of objects in the smoothed image and creating a new image by overlapping a kernel at each pixel, wherein when any pixel in an N×N kernel is 1, that new pixel is 1, thereby expanding white regions when any white pixel falls in a kernel space. Moreover, the applying module 418 may be further configured to apply an erosion algorithm as mentioned earlier in which a new image is created by overlapping an N×N kernel over each pixel, wherein when all pixels under the kernel are 1, it places a 1, and when any pixel is 0, the whole value is 0, thereby eroding away the node boundaries of objects and leaves only solid regions of white pixels.

Additionally, according to exemplary embodiments, in applying an adaptive threshold algorithm, the implementing module 414 may be further configured to implement an adaptive mean threshold algorithm as mentioned earlier; and implement Otsu thresholding algorithm as mentioned earlier to return a single intensity threshold that separate pixels into two partitions which minimizes variance between the two partitions.

According to exemplary embodiments, the implementing module 414 may be further configured to implement a watershed algorithm to apply the labels onto the grayscale image. The determining module 422 may be configured to determine contour of each node.

According to exemplary embodiments, the implementing module 414 then may implement a network-based algorithm that may include that may include the following, but the disclosure is not limited thereto. For example, the selecting module may be configured to select, for each node, a middle pixel that is still a valid marker. The aggregating module 426 may be configured to aggregate all node pixels with same value as one object. The combining module 428 may be configured to combine, given the nodes, every pair. The launching module 430 may be configured to launch a graph search between two adjacent nodes. The recording module 432 may be configured to record a path and intermediate nodes traversed. The condensing module 434 may be configured to condense, given the path, consecutive pixel values into a single item providing unique nodes per step. The creating module 436 may be configured to create a smaller graph including only marker identifiers as a network. The transposing module 438 may be configured to transpose the network on the first image.

And the deriving module 440 may be configured to deterministically derive underlying graph structure and associated text information in the document by applying the vision-based algorithm and the network-based algorithm as disclosed above.

Figure 22:
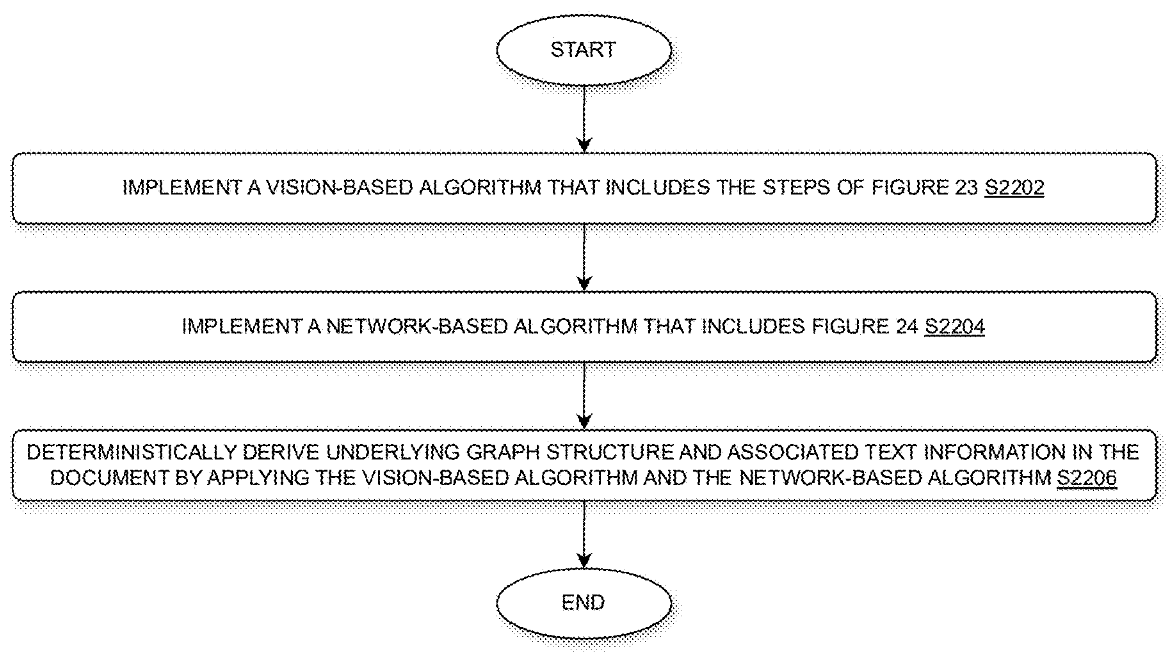
FIG. 22 illustrates an exemplary flow chart of a process implemented by the platform, language, database, and cloud agnostic vision-assisted network discovery module of FIG. 4 for implementing a vision-assisted network discovery algorithm to discover, extract, and organize graph structured diagrams in visual mediums into a structured representation in accordance with an exemplary embodiment.
Figure 23:
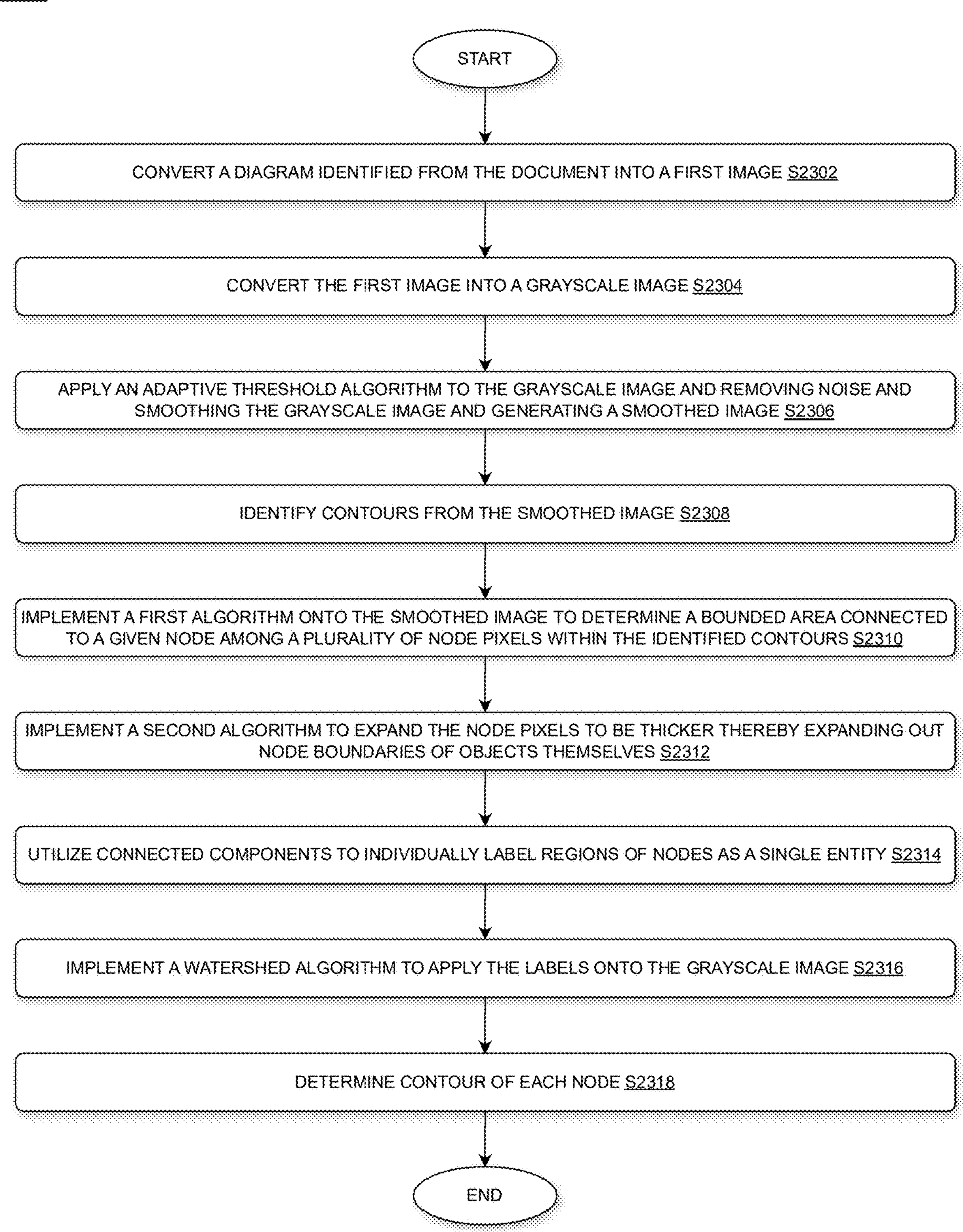
FIG. 23 illustrates an exemplary flow chart of a process of a vision-based algorithm as implemented by the platform, language, database, and cloud agnostic vision-assisted network discovery module of FIG. 4 in accordance with an exemplary embodiment.
Figure 24:
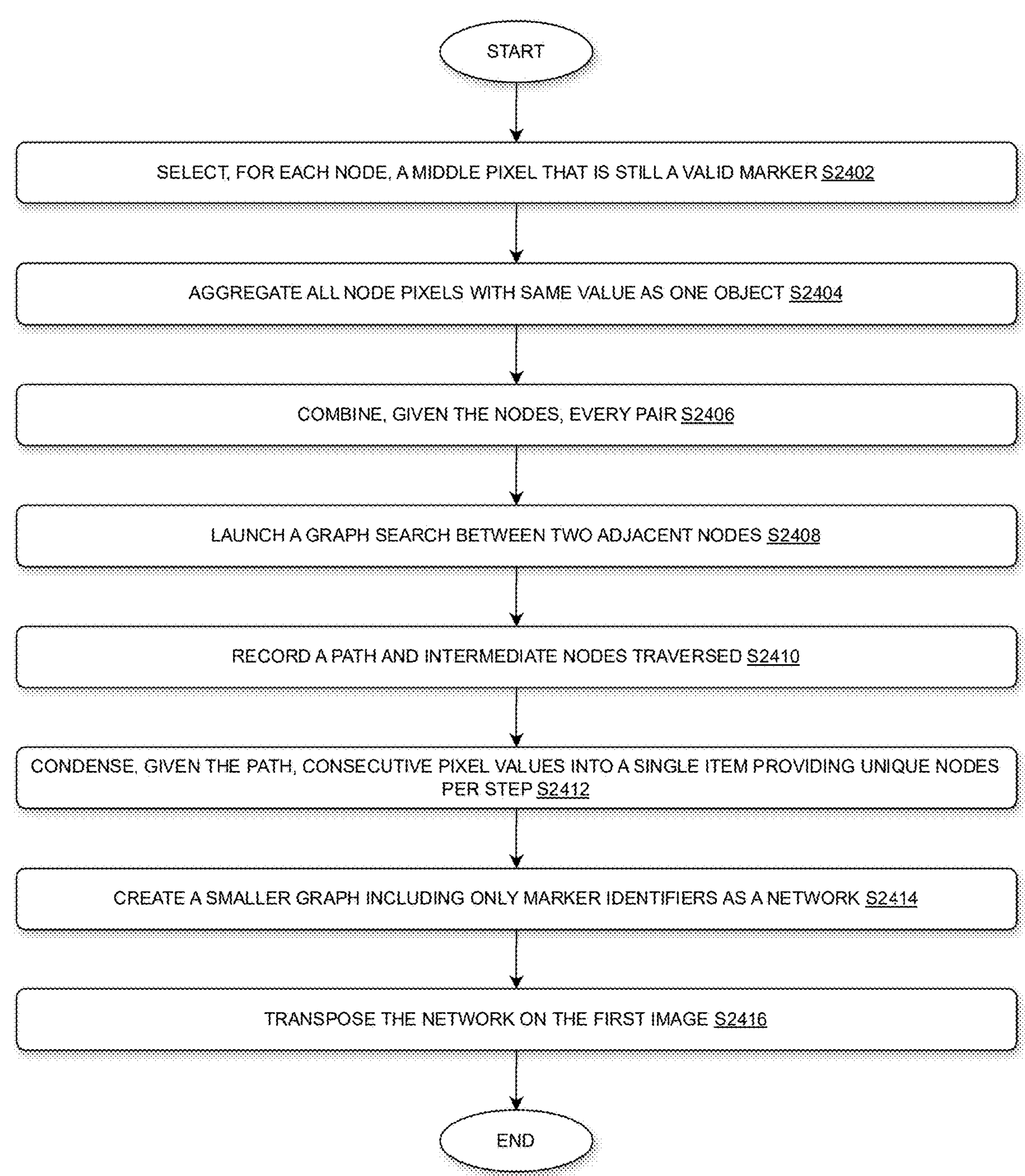
FIG. 24 illustrates an exemplary flow chart of a process of a network-based algorithm as implemented by the platform, language, database, and cloud agnostic vision-assisted network discovery module of FIG. 4 in accordance with an exemplary embodiment.

FIG. 22 illustrates an exemplary flow chart of a process 2200 implemented by the platform, language, database, and cloud agnostic VANDM 406 of FIG. 4 for implementing a vision-assisted network discovery algorithm to discover, extract, and organize graph structured diagrams in visual mediums into a structured representation in accordance with an exemplary embodiment. FIG. 23 illustrates an exemplary flow chart of a process 2300 of a vision-based algorithm (i.e., step 2202 in FIG. 22) as implemented by the platform, language, database, and cloud agnostic VANDM 406 of FIG. 4 in accordance with an exemplary embodiment. FIG. 24 illustrates an exemplary flow chart of a process 2400 of a network-based algorithm (i.e., step 2204 in FIG. 22) as implemented by the platform, language, database, and cloud agnostic VANDM 406 of FIG. 4 in accordance with an exemplary embodiment. It may be appreciated that the illustrated processes 2200, 2300, and 2400 and associated steps may be performed in a different order, with illustrated steps omitted, with additional steps added, or with a combination of reordered, combined, omitted, or additional steps.

As illustrated in FIG. 22, at step S2202, the process 2200 may include implementing a vision-based algorithm that may include the steps of FIG. 23.

At step S2204, the process 2200 may include implementing a network-based algorithm that may include the steps of FIG. 24.

At step S2206, the process 2200 may include deterministically deriving underlying graph structure and associated text information in the document by applying the vision-based algorithm of FIG. 23 and the network-based algorithm of FIG. 24.

For example, as illustrated in FIG. 23, the vision-based algorithm may include the following steps.

At step S2302, the process 2300 may include converting a diagram identified from the document into a first image. At step S2304, the process 2300 may include converting the first image into a grayscale image. At step S2306, the process 2300 may include applying an adaptive threshold algorithm to the grayscale image and removing noise and smoothing the grayscale image and generating a smoothed image (see, e.g., FIG. 6). At step S2308, the process 2300 may include identifying contours from the smoothed image. At step S2310, the process 2300 may include implementing a first algorithm (i.e., flood fill algorithm) onto the smoothed image to determine a bounded area connected to a given node among a plurality of node pixels within the identified contours. At step S2312, the process 2300 may include implementing a second algorithm (i.e., morphological operations including dilation algorithm) to expand the node pixels to be thicker thereby expanding out node boundaries of objects themselves (see, e.g., FIG. 7). At step S2314, the process 2300 may include utilizing connected components to individually label regions of nodes as a single entity. At step S2316, the process 2300 may include implementing a watershed algorithm to apply the labels onto the grayscale image. At step S2318, the process 2300 may include determining contour of each node.

For example, as illustrated in FIG. 24, the network-based algorithm may include the following steps.

At step S2402, the process 2400 may include selecting, for each node, a middle pixel that is still a valid marker. At step S2404, the process 2400 may include aggregating all node pixels with same value as one object. At step S2406, the process 2400 may include combining, given the nodes, every pair. At step S2408, the process 2400 may include launching a graph search between two adjacent nodes. At step S2410, the process 2400 may include recording a path and intermediate nodes traversed. At step S2412, the process 2400 may include condensing, given the path, consecutive pixel values into a single item providing unique nodes per step. At step S2414, the process 2400 may include creating a smaller graph including only marker identifiers as a network. At step S2416, the process 2400 may include transposing the network on the first image.

Referring back to FIG. 22, according to exemplary embodiments, in the process 2200, the document may be one or more of the following documents: a PDF document, an image, and a HTML document, etc., but the disclosure is not limited thereto.

According to exemplary embodiments, in implementing the first algorithm, the process 2200 may further include: applying a flood fill algorithm onto the smoothed image, wherein continuous blocks of pixels form the nodes, and wherein the nodes represent thicker objects.

According to exemplary embodiments, in implementing the second algorithm, the process 2200 may further include: applying morphological operations with 1×1 kernel.

According to exemplary embodiments, the process 2200 may further include: applying a dilation algorithm that adds pixels to the boundaries of objects in the smoothed image and creating a new image by overlapping a kernel at each pixel, wherein when any pixel in an N×N kernel is 1, that new pixel is 1, thereby expanding white regions when any white pixel falls in a kernel space.

According to exemplary embodiments, the process 2200 may further include: applying an erosion algorithm in which a new image is created by overlapping an N×N kernel over each pixel, wherein when all pixels under the kernel are 1, it places a 1, and when any pixel is 0, the whole value is 0, thereby eroding away the node boundaries of objects and leaves only solid regions of white pixels.

According to exemplary embodiments, in applying an adaptive threshold algorithm, the process 2200 may further include: implementing an adaptive mean threshold algorithm; and implementing Otsu thresholding algorithm to return a single intensity threshold that separate pixels into two partitions which minimizes variance between the two partitions.

According to exemplary embodiments, the VANDD 402 may include a memory (e.g., a memory 106 as illustrated in FIG. 1) which may be a non-transitory computer readable medium that may be configured to store instructions for implementing a platform, language, database, and cloud agnostic VANDM 406 for deterministically deriving underlying graph structure and associated text information in a document as disclosed herein. The VANDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the VANDM 406 or within the VANDD 402, may be used to perform one or more of the methods and processes as described herein. In a particular embodiment, the instructions may reside completely, or at least partially, within the memory 106, the medium reader 112, and/or the processor 104 (see FIG. 1) during execution by the VANDD 402.

According to exemplary embodiments, the instructions, when executed, may cause a processor embedded within the VANDM 406 or the VANDD 402 to perform the following: implementing a vision-based algorithm that may include the following, but the disclosure is not limited thereto: converting a diagram identified from the document into a first image; converting the first image into a grayscale image; applying an adaptive threshold algorithm to the grayscale image and removing noise and smoothing the grayscale image and generating a smoothed image; identifying contours from the smoothed image; implementing a first algorithm onto the smoothed image to determine a bounded area connected to a given node among a plurality of node pixels within the identified contours; implementing a second algorithm to expand the node pixels to be thicker thereby expanding out node boundaries of objects themselves; utilizing connected components to individually label regions of nodes as a single entity; implementing a watershed algorithm to apply the labels onto the grayscale image; determining contour of each node; implementing a network-based algorithm that may include the following, but the disclosure is not limited thereto: selecting, for each node, a middle pixel that is still a valid marker; aggregating all node pixels with same value as one object; combining, given the nodes, every pair; launching a graph search between two adjacent nodes; recording a path and intermediate nodes traversed; condensing, given the path, consecutive pixel values into a single item providing unique nodes per step; creating a smaller graph including only marker identifiers as a network; transposing the network on the first image; and deterministically deriving underlying graph structure and associated text information in the document by applying the vision-based algorithm and the network-based algorithm, but the disclosure is not limited thereto. According to exemplary embodiments, the processor may be the same or similar to the processor 104 as illustrated in FIG. 1 or the processor embedded within the VANDD 202, VANDD 302, VANDD 402, and VANDM 406 which is the same or similar to the processor 104.

According to exemplary embodiments, in implementing the first algorithm, the instructions, when executed, may cause the processor 104 to further perform the following: applying a flood fill algorithm onto the smoothed image, wherein continuous blocks of pixels form the nodes, and wherein the nodes represent thicker objects.

According to exemplary embodiments, in implementing the second algorithm, the instructions, when executed, may cause the processor 104 to further perform the following: applying morphological operations with 1×1 kernel.

According to exemplary embodiments, the instructions, when executed, may cause the processor 104 to further perform the following: applying a dilation algorithm that adds pixels to the boundaries of objects in the smoothed image and creating a new image by overlapping a kernel at each pixel, wherein when any pixel in an N×N kernel is 1, that new pixel is 1, thereby expanding white regions when any white pixel falls in a kernel space.

According to exemplary embodiments, the instructions, when executed, may cause the processor 104 to further perform the following: applying an erosion algorithm in which a new image is created by overlapping an N×N kernel over each pixel, wherein when all pixels under the kernel are 1, it places a 1, and when any pixel is 0, the whole value is 0, thereby eroding away the node boundaries of objects and leaves only solid regions of white pixels.

According to exemplary embodiments, in applying an adaptive threshold algorithm, the instructions, when executed, may cause the processor 104 to further perform the following: implementing an adaptive mean threshold algorithm; and implementing Otsu thresholding algorithm to return a single intensity threshold that separate pixels into two partitions which minimizes variance between the two partitions.

According to exemplary embodiments as disclosed above in FIGS. 1-24, technical improvements effected by the instant disclosure may include a platform for implementing a platform, language, database, and cloud agnostic vision-assisted network discovery module configured to implement a vision-assisted network discovery algorithm to discover, extract, and organize graph structured diagrams in visual mediums into a structured representation, but the disclosure is not limited thereto. Therefore, users can instantly gain insight into hallucination probability and revise a query accordingly. For example, according to exemplary embodiments as disclosed above in FIGS. 1-24, technical improvements effected by the instant disclosure may include a platform for implementing a platform, language, database, and cloud agnostic vision-assisted network discovery module configured to implement a vision-assisted network discovery algorithm in a manner such that one may understand space (i.e., empty space or blank space or negative space) in documents (i.e., PDFs, images, HTML, etc.) which then may help to understand structure of flow charts, organizational charts, tables, or of the document itself, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for deterministically deriving underlying graph structure and associated text information in a document by utilizing one or more processors along with allocated memory, the method comprising:

implementing a vision-based algorithm that includes:

converting a diagram identified from the document into a first image;

converting the first image into a grayscale image;

applying an adaptive threshold algorithm to the grayscale image and removing noise and smoothing the grayscale image and generating a smoothed image;

identifying contours from the smoothed image;

implementing a first algorithm onto the smoothed image to determine a bounded area connected to a given node among a plurality of node pixels within the identified contours;

implementing a second algorithm to expand the node pixels to be thicker thereby expanding out node boundaries of objects themselves;

utilizing connected components to individually label regions of nodes as a single entity;

implementing a watershed algorithm to apply the labels onto the grayscale image;

determining contour of each node;

implementing a network-based algorithm that includes:

selecting, for each node, a middle pixel that is still a valid marker;

aggregating all node pixels with same value as one object;

combining, given the nodes, every pair;

launching a graph search between two adjacent nodes;

recording a path and intermediate nodes traversed;

condensing, given the path, consecutive pixel values into a single item providing unique nodes per step;

creating a smaller graph including only marker identifiers as a network;

transposing the network on the first image; and deterministically deriving underlying graph structure and associated text information in the document by applying the vision-based algorithm and the network-based algorithm.

2. The method according to claim 1, wherein the document is one or more of the following documents: a Portable Document Format (PDF) document, an image, and a Hyper Text Markup Language (HTML) document.

3. The method according to claim 1, wherein in implementing the first algorithm, the method further comprising:

applying a flood fill algorithm onto the smoothed image, wherein continuous blocks of pixels form the nodes, and wherein the nodes represent thicker objects.

4. The method according to claim 1, wherein in implementing the second algorithm, the method further comprising:

applying morphological operations with 1×1 kernel.

5. The method according to claim 4, further comprising:

applying a dilation algorithm that adds pixels to the boundaries of objects in the smoothed image and creating a new image by overlapping a kernel at each pixel, wherein when any pixel in an N×N kernel is 1, that new pixel is 1, thereby expanding white regions when any white pixel falls in a kernel space.

6. The method according to claim 4, further comprising:

applying an erosion algorithm in which a new image is created by overlapping an N×N kernel over each pixel, wherein when all pixels under the kernel are 1, it places a 1, and when any pixel is 0, the whole value is 0, thereby eroding away the node boundaries of objects and leaves only solid regions of white pixels.

7. The method according to claim 1, wherein in applying an adaptive threshold algorithm, the method further comprising:

implementing an adaptive mean threshold algorithm; and implementing Otsu thresholding algorithm to return a single intensity threshold that separate pixels into two partitions which minimizes variance between the two partitions.

8. A system for deterministically deriving underlying graph structure and associated text information in a document, the system comprising:

a processor; and a memory operatively connected to the processor via a communication interface, the memory storing computer readable instructions, when executed, causes the processor to:

implement a vision-based algorithm that includes:

converting a diagram identified from the document into a first image;

converting the first image into a grayscale image;

applying an adaptive threshold algorithm to the grayscale image and removing noise and smoothing the grayscale image and generating a smoothed image;

identifying contours from the smoothed image;

implementing a first algorithm onto the smoothed image to determine a bounded area connected to a given node among a plurality of node pixels within the identified contours;

implementing a second algorithm to expand the node pixels to be thicker thereby expanding out node boundaries of objects themselves;

utilizing connected components to individually label regions of nodes as a single entity;

implementing a watershed algorithm to apply the labels onto the grayscale image;

determining contour of each node;

implement a network-based algorithm that includes:

selecting, for each node, a middle pixel that is still a valid marker;

aggregating all node pixels with same value as one object;

combining, given the nodes, every pair;

launching a graph search between two adjacent nodes;

recording a path and intermediate nodes traversed;

condensing, given the path, consecutive pixel values into a single item providing unique nodes per step;

creating a smaller graph including only marker identifiers as a network;

transposing the network on the first image; and deterministically derive underlying graph structure and associated text information in the document by applying the vision-based algorithm and the network-based algorithm.

9. The system according to claim 8, wherein the document is one or more of the following documents: a Portable Document Format (PDF) document, an image, and a Hyper Text Markup Language (HTML) document.

10. The system according to claim 8, in implementing the first algorithm, the processor is further configured to:

apply a flood fill algorithm onto the smoothed image, wherein continuous blocks of pixels form the nodes, and wherein the nodes represent thicker objects.

11. The system according to claim 8, in implementing the second algorithm, the processor is further configured to:

apply morphological operations with 1×1 kernel.

12. The system according to claim 11, wherein the processor is further configured to:

apply a dilation algorithm that adds pixels to the boundaries of objects in the smoothed image and create a new image by overlapping a kernel at each pixel, wherein when any pixel in an N×N kernel is 1, that new pixel is 1, thereby expanding white regions when any white pixel falls in a kernel space.

13. The system according to claim 11, wherein the processor is further configured to:

apply an erosion algorithm in which a new image is created by overlapping an N×N kernel over each pixel, wherein when all pixels under the kernel are 1, it places a 1, and when any pixel is 0, the whole value is 0, thereby eroding away the node boundaries of objects and leaves only solid regions of white pixels.

14. The system according to claim 8, in applying an adaptive threshold algorithm, the processor is further configured to:

implement an adaptive mean threshold algorithm; and implement Otsu thresholding algorithm to return a single intensity threshold that separate pixels into two partitions which minimizes variance between the two partitions.

15. A non-transitory computer readable medium configured to store instructions for deterministically deriving underlying graph structure and associated text information in a document, the instructions, when executed, cause a processor to perform the following:

implementing a vision-based algorithm that includes:

converting a diagram identified from the document into a first image;

converting the first image into a grayscale image;

applying an adaptive threshold algorithm to the grayscale image and removing noise and smoothing the grayscale image and generating a smoothed image;

identifying contours from the smoothed image;

implementing a first algorithm onto the smoothed image to determine a bounded area connected to a given node among a plurality of node pixels within the identified contours;

implementing a second algorithm to expand the node pixels to be thicker thereby expanding out node boundaries of objects themselves;

utilizing connected components to individually label regions of nodes as a single entity;

implementing a watershed algorithm to apply the labels onto the grayscale image;

determining contour of each node;

implementing a network-based algorithm that includes:

selecting, for each node, a middle pixel that is still a valid marker;

aggregating all node pixels with same value as one object;

combining, given the nodes, every pair;

launching a graph search between two adjacent nodes;

recording a path and intermediate nodes traversed;

condensing, given the path, consecutive pixel values into a single item providing unique nodes per step;

creating a smaller graph including only marker identifiers as a network;

transposing the network on the first image; and deterministically deriving underlying graph structure and associated text information in the document by applying the vision-based algorithm and the network-based algorithm.

16. The non-transitory computer readable medium according to claim 15, wherein the document is one or more of the following documents: a Portable Document Format (PDF) document, an image, and a Hyper Text Markup Language (HTML) document.

17. The non-transitory computer readable medium according to claim 15, in implementing the first algorithm, the instructions, when executed, cause the processor to further perform the following:

applying a flood fill algorithm onto the smoothed image, wherein continuous blocks of pixels form the nodes, and wherein the nodes represent thicker objects.

18. The non-transitory computer readable medium according to claim 15, in implementing the second algorithm, the instructions, when executed, cause the processor to further perform the following:

applying morphological operations with 1×1 kernel.

19. The non-transitory computer readable medium according to claim 18, wherein the instructions, when executed, cause the processor to further perform the following:

applying a dilation algorithm that adds pixels to the boundaries of objects in the smoothed image and creating a new image by overlapping a kernel at each pixel, wherein when any pixel in an N×N kernel is 1, that new pixel is 1, thereby expanding white regions when any white pixel falls in a kernel space.

20. The non-transitory computer readable medium according to claim 18, wherein the instructions, when executed, cause the processor to further perform the following:

applying an erosion algorithm in which a new image is created by overlapping an N×N kernel over each pixel, wherein when all pixels under the kernel are 1, it places a 1, and when any pixel is 0, the whole value is 0, thereby eroding away the node boundaries of objects and leaves only solid regions of white pixels.

* * * * *